(12) United States Patent
Izumi et al.

(10) Patent No.: US 10,780,879 B2
(45) Date of Patent: Sep. 22, 2020

(54) PARKING CONTROLLER, PARKING CONTROL SYSTEM, AND PARKING CONTROL METHOD

(71) Applicant: DENSO TEN Limited, Kobe-shi, Hyogo (JP)

(72) Inventors: Yuki Izumi, Kobe (JP); Masashi Tsuyunashi, Kobe (JP); Wataru Hasegawa, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 252 days.

(21) Appl. No.: 15/887,349

(22) Filed: Feb. 2, 2018

(65) Prior Publication Data
US 2018/0229719 A1    Aug. 16, 2018

(30) Foreign Application Priority Data

Feb. 14, 2017  (JP) ................................ 2017-025145
Sep. 1, 2017   (JP) ................................ 2017-168694
Jan. 26, 2018  (JP) ................................ 2018-011724

(51) Int. Cl.
*B60W 30/06* (2006.01)
*G08G 1/127* (2006.01)
*G06K 9/00* (2006.01)

(52) U.S. Cl.
CPC ......... *B60W 30/06* (2013.01); *G06K 9/00812* (2013.01); *G08G 1/127* (2013.01);
(Continued)

(58) Field of Classification Search
CPC .................................................... B60W 30/06
See application file for complete search history.

(56) References Cited

U.S. PATENT DOCUMENTS 9,522,675 B1 * 12/2016  You .................... B60W 30/06
9,612,123 B1 *  4/2017  Levinson ............... G01C 21/32
(Continued)

FOREIGN PATENT DOCUMENTS

JP    H10-275300 A    10/1998
JP    2011-216016 A   10/2011
(Continued)

*Primary Examiner* — Alex C Dunn
(74) *Attorney, Agent, or Firm* — Oliff PLC

(57) ABSTRACT

A parking controller according to one aspect of an embodiment includes a specific-parking-frame acquiring unit, a target-parking-frame setting unit, and a vacant-parking-frame detecting unit. The specific-parking-frame acquiring unit acquires information indicating a specific parking frame. The specific parking frame is a parking frame that is specified by an external device among from a plurality of parking frames in a parking lot. The target-parking-frame setting unit sets the specific parking frame as a target parking frame. The target parking frame is a parking frame to be a target. The vacant-parking-frame detecting unit detects a vacant parking frame while an own vehicle is travelling to the target parking frame. The vacant parking frame is a parking frame in a vacant state. The target-parking-frame setting unit changes, when the vacant-parking-frame detecting unit detects the vacant parking frame, the set target parking frame into the vacant parking frame.

16 Claims, 14 Drawing Sheets

(52) U.S. Cl.
CPC ..... *B60W 2554/00* (2020.02); *B60W 2555/20* (2020.02); *B60W 2556/50* (2020.02); *B60W 2556/65* (2020.02); *B60W 2756/10* (2020.02)

(56) References Cited

U.S. PATENT DOCUMENTS

| | | | |
|---|---|---|---|
| 10,185,327 B1* | 1/2019 | Konrardy | G05D 1/0088 |
| 2017/0123421 A1* | 5/2017 | Kentley | G01S 17/87 |
| 2017/0123429 A1* | 5/2017 | Levinson | G05D 1/0088 |
| 2017/0144654 A1* | 5/2017 | Sham | B60W 30/06 |
| 2017/0267233 A1* | 9/2017 | Minster | B62D 15/02 |
| 2018/0001930 A1* | 1/2018 | Sham | G01S 5/0027 |
| 2018/0088572 A1* | 3/2018 | Uchida | B60W 50/14 |
| 2018/0164830 A1* | 6/2018 | Moosaei | G06K 9/00798 |
| 2018/0164831 A1* | 6/2018 | Han | B60R 1/00 |
| 2018/0286240 A1* | 10/2018 | Harai | B60W 30/06 |
| 2019/0275898 A1* | 9/2019 | Haneda | G08G 1/146 |
| 2019/0283736 A1* | 9/2019 | Watanabe | B60W 30/06 |

FOREIGN PATENT DOCUMENTS

| | | |
|---|---|---|
| JP | 2014-100958 A | 6/2014 |
| JP | 2016-007920 A | 1/2016 |

\* cited by examiner

FIG.3

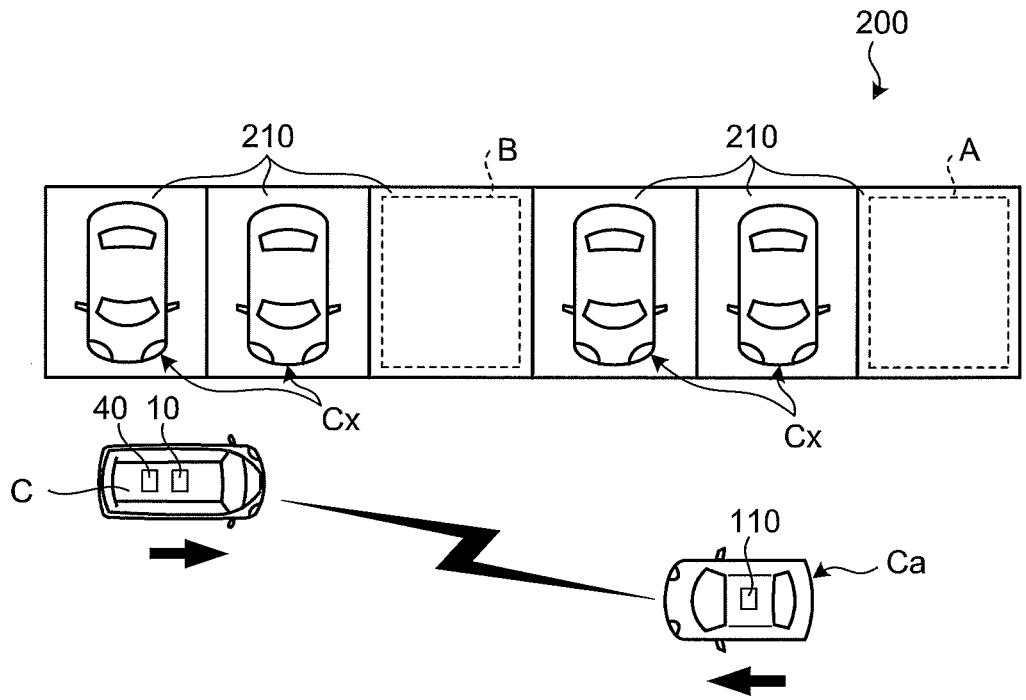

FIG.4

| PREFERENCE DEGREE INFORMATION | INFORMATION CONTENT OF OWN VEHICLE | INFORMATION CONTENT OF ANOTHER VEHICLE | DETERMINA-TION ORDER |
|---|---|---|---|
| ACQUISITION TIME POINT INFORMATION | 12:10 | 12:15 | 1 |
| DISTANCE INFORMATION | 2m | 3m | 2 |
| VEHICLE-SIZE INFORMATION | LARGE-SIZE | SMALL-SIZE | 3 |
| NUMBER-OF-OCCUPANTS INFORMATION | 4 | 2 | 4 |
| INFORMATION ON NUMBER OF USE TIMES | 50 | 10 | 5 |
| INFORMATION ON USE FREQUENCY | ONCE A WEEK | ONCE A MONTH | 6 |
| ⋮ | ⋮ | ⋮ | ⋮ |

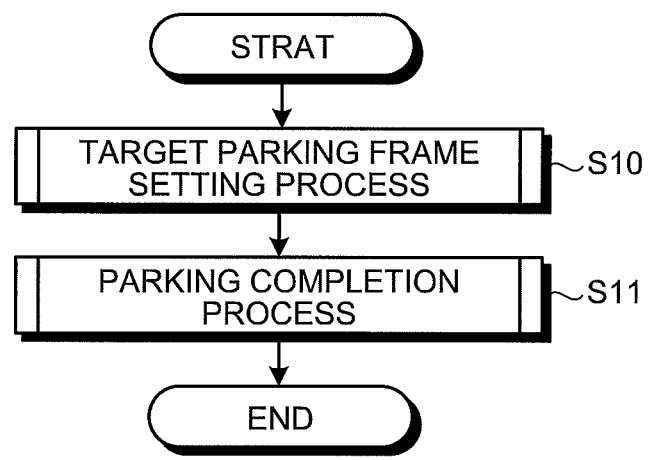

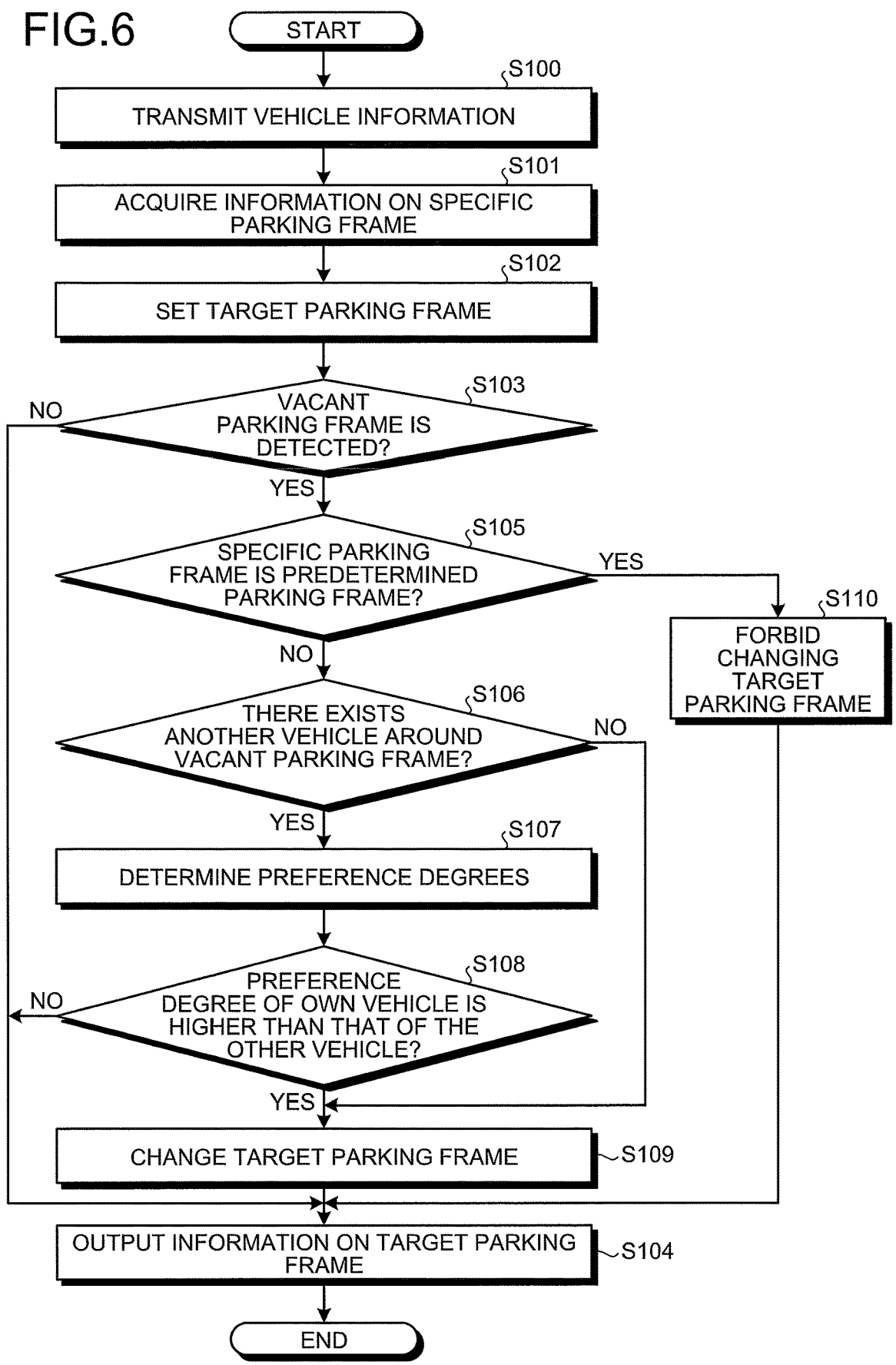

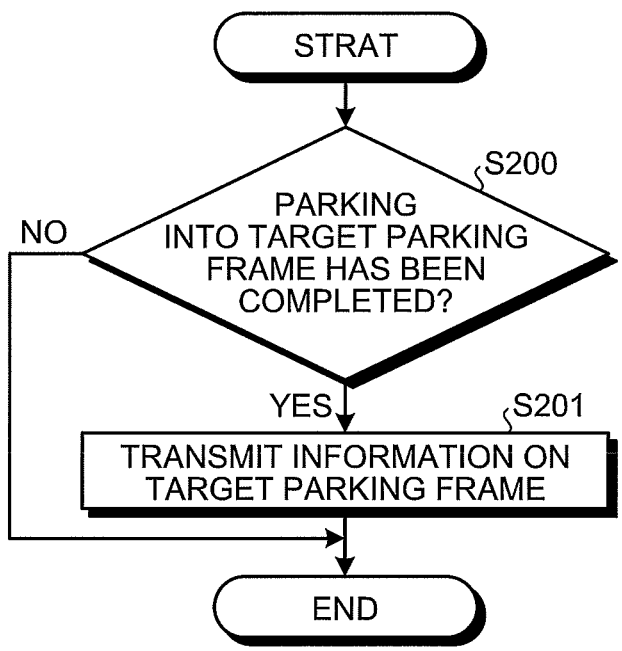

FIG.14

| AGE | FACTOR |
|---|---|
| UNDER 10 YEARS OF AGE | 1.5 |
| 10'S | 1 |
| 20'S | 1 |
| 30'S | 1 |
| 40'S | 1.1 |
| 50'S | 1.2 |
| 60'S | 1.3 |
| 70'S | 1.4 |
| 80'S | 1.5 |
| 90'S | 1.6 |

FIG.15

| LUGGAGE AMOUNT | FACTOR |
|---|---|
| NO LUGGAGE | 1 |
| TO BE CARRIED IN ONE HAND | 1.1 |
| TO BE CARRIED IN BOTH HANDS | 1.2 |
| TO BE HELD IN BOTH ARMS | 1.4 |
| CART | 1.3 |

PARKING CONTROLLER, PARKING CONTROL SYSTEM, AND PARKING CONTROL METHOD

CROSS-REFERENCE TO RELATED APPLICATIONS

This application is based upon and claims the benefit of priority of the prior Japanese Patent Application No. 2017-025145, filed on Feb. 14, 2017; Japanese Patent Application No. 2017-168694, filed on Sep. 1, 2017; and Japanese Patent Application No. 2018-011724, filed on Jan. 26, 2018, the entire contents of all of which are incorporated herein by reference.

FIELD

The embodiments discussed herein are directed to a parking controller, a parking control system, and a parking control method.

BACKGROUND

Conventionally, there is proposed a technology to park, on the basis of information from a device for managing a parking lot, a vehicle capable of autonomously driving when causing the vehicle to stop in the parking lot including a plurality of parking frames (see Japanese Laid-open Patent Publication No. H10-275300, for example).

For example, in the conventional technology, after a driver gets out of the vehicle in an entrance of the parking lot, the parking-lot managing apparatus specifies one parking frame in a vacant state among from the parking frames, and information indicating the specific parking frame (parking frame that has been specified) is transmitted to the vehicle. A parking control system provided in the vehicle acquires information on the specific parking frame from the parking-lot managing apparatus so as to set the acquired specific parking frame to be a target parking frame. The parking control system causes the vehicle to travel to the target parking frame by autonomous driving so as to perform parking at the target parking frame.

However, in the above-mentioned conventional technology, there exists room for improvement in improving parking efficiency of vehicles in a parking lot. In other words, a vacant situation of parking frames in the parking lot is changed by the incoming/outgoing of vehicles as time passes. In the conventional technology, the parking is performed on the target parking frame that is set at the entrance, and thus is not able to deal with a changed vacant situation of the parking frames, thereby leading to a fear that the parking efficiency of vehicles is reduced as a result.

SUMMARY

A parking controller according to an aspect of an embodiment includes a specific-parking-frame acquiring unit, a target-parking-frame setting unit, and a vacant-parking-frame detecting unit. The specific-parking-frame acquiring unit acquires information indicating a specific parking frame. The specific parking frame is a parking frame that is specified by an external device among from a plurality of parking frames in a parking lot. The target-parking-frame setting unit sets the specific parking frame as a target parking frame. The target parking frame is a parking frame to be a target. The vacant-parking-frame detecting unit detects a vacant parking frame while an own vehicle is travelling to the target parking frame. The vacant parking frame is a parking frame in a vacant state. The target-parking-frame setting unit changes, when the vacant-parking-frame detecting unit detects the vacant parking frame, the set target parking frame into the vacant parking frame.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 3 is a diagram illustrating a preference degree determination that is performed by a preference-degree determining unit;

FIG. 4 is a diagram illustrating one example of preference degree information;

FIG. 5 is a flowchart illustrating a procedure for a parking control process to be executed by a parking controller;

FIG. 6 is a flowchart illustrating a procedure for a target-parking-frame setting process;

FIG. 7 is a flowchart illustrating a procedure for a parking completion process;

FIG. 14 is a diagram illustrating one example of user factor information;

FIG. 15 is a diagram illustrating one example of the user factor information.

DESCRIPTION OF EMBODIMENTS

1. First Embodiment

1.1. Outline of Parking Control Method

Figure 1:
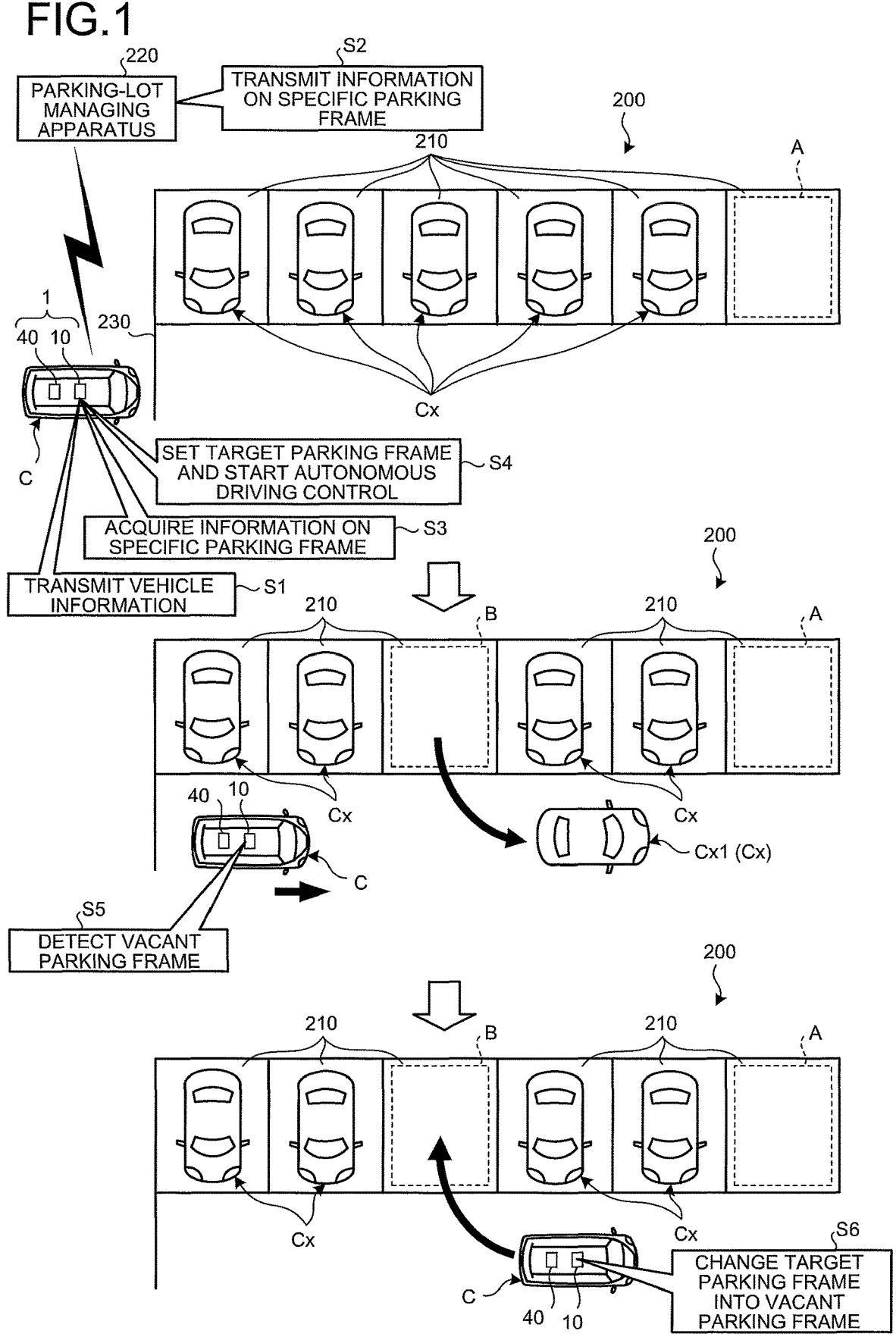
FIG. 1 is a diagram illustrating an outline of a parking control method according to a first embodiment.

Hereinafter, an outline of a parking control method according to a first embodiment will be explained with reference to FIG. 1. FIG. 1 is a diagram illustrating the outline of the parking control method according to the first embodiment.

The parking control method according to the first embodiment is performed by a parking controller 10 included in a vehicle C, for example. As illustrated in an upper part of FIG. 1, the vehicle C, such as an automobile, is provided with a parking control system 1, and the parking control system 1 includes the parking controller 10 and a vehicle controller 40. Hereinafter, the vehicle C may be referred to as "own vehicle C".

The parking controller 10 performs a parking control on the own vehicle C, which will be mentioned later. A specific configuration of the parking controller 10 will be explained with reference to FIG. 2.

When a driver performs a driving operation on a gas pedal, a brake pedal, a steering wheel, or the like, for example, the vehicle controller 40 controls a drive source such as an engine, a brake device, a steering device, etc. (not illustrated) in accordance with the driving operation so as to control behavior of the own vehicle C.

The vehicle controller 40 is able to perform autonomous driving control that needs no driving operation of a driver. For example, the vehicle controller 40 controls the own vehicle C on the basis of information of a Global Positioning System (GPS) and peripheral image information of the own vehicle C captured by a camera (not illustrated) among other things to be able to cause the own vehicle C to travel to a target parking frame to be mentioned later and park the own vehicle C in the target parking frame by autonomous driving.

Hereinafter, a case will be explained as an example in which the own vehicle C performs parking in a parking lot 200 by autonomous driving control. The parking lot 200 includes a plurality of parking frames 210 and a parking-lot managing apparatus 220.

In the example illustrated in the upper part of FIG. 1, parked vehicles Cx have been already parked in the several parking frames 210 among the plurality of parking frames 210. On the other hand, there does not exist the parked vehicle Cx in the parking frame 210 on the right side of the sheet, and this parking frame 210 is in a vacant state.

Hereinafter, the parking frame 210 in a vacant state may be referred to as "vacant parking frame". In the upper part of FIG. 1, a vacant parking frame on the right side of the sheet is surrounded by a dashed line A, and this vacant parking frame may be referred to as "vacant parking frame A" in the following.

The parking frames 210 are provided with respective vehicle detecting sensors (not illustrated) for detecting the parked vehicles Cx, when detecting the parked vehicle Cx, each of vehicle detecting sensors outputs a detection signal to the parking-lot managing apparatus 220. An infrared-ray sensor, a weight sensor, etc., not limited thereto, may be employed as the vehicle detecting sensor.

The parking-lot managing apparatus 220 is a center server that manages the overall of the parking lot 200, for example. The parking-lot managing apparatus 220 acquires information on vacant situations of the parking frames 210 in the parking lot 200 on the basis of the above-mentioned detection signals of the vehicle detecting sensors. For example, the parking-lot managing apparatus 220 may analyze an image captured by an in-ground camera (not illustrated) etc. arranged in the parking lot 200 so as to acquire information on the vacant situations, not limited to the case where the detection signal of the vehicle detecting sensor is used.

The parking-lot managing apparatus 220 is able to communicate with each of the vehicle C and the vehicles Cx. The parking-lot managing apparatus 220 is one example of an external device.

In the parking lot 200 configured as described above, a parking control (namely, autonomous valet parking), of the own vehicle C using the autonomous driving control is performed. Assume that, as illustrated in the upper part of FIG. 1, the own vehicle C is parked in front of an entrance 230 of the parking lot 200.

For example, a user such as a driver gets out of the own vehicle C and then the user operates a button for requesting an autonomous driving control parking, the parking controller 10 transmits vehicle information including vehicle-size information of the own vehicle C etc. to the parking-lot managing apparatus 220 (Step S1).

Next, the parking-lot managing apparatus 220 specifies, for example, the one vacant parking frame A that is appropriate for the vehicle size of the own vehicle C among from the parking frames 210 on the basis of the transmitted vehicle information and the information on vacant situations, and transmits information indicating a specific parking frame (in this case, vacant parking frame A) that is a parking frame specified by the parking-lot managing apparatus 220 to the own vehicle C (Step S2).

The parking controller 10 acquires information on the specific parking frame transmitted from the parking-lot managing apparatus 220 (Step S3). Next, the parking controller 10 sets the specific parking frame to be a target parking frame, which is a parking frame to be a target, whereby an autonomous driving control to the target parking frame is started by the vehicle controller 40 (Step S4).

Meanwhile, the vacant situations of the parking frames 210 in the parking lot 200 can be changed as time passes. Specifically, as illustrated in a middle part of FIG. 1, one of the parked vehicles Cx leaves, in some cases, its parking frame while the own vehicle C is travelling to the target parking frame (in this case, vacant parking frame A), for example. In the middle part of FIG. 1, the outgoing parked vehicle Cx is indicated by using a reference symbol Cx1.

Thus, the parking frames 210 having vacant states among the parking frames 210 become the vacant parking frame A and a vacant parking frame B so that the vacant situations are changed. In the conventional technology, the parking is performed on a target parking frame set at the entrance 230, the own vehicle C accordingly passes by the vacant parking frame B to be parked in the vacant parking frame A, thereby leading to a fear that the parking efficiency of the own vehicle C is reduced as a result.

Therefore, in the parking control method according to the present embodiment, a vacant parking frame is detected while the own vehicle C is travelling to a target parking frame (Step S5). In the middle part of FIG. 1, assume that the parking controller 10 detects the vacant parking frame B.

As illustrated in a lower part of FIG. 1, the parking controller 10 changes the target parking frame set at the entrance 230 into the vacant parking frame B (Step S6). Thus, the own vehicle C is to be parked in a newly set target parking frame (in this case, vacant parking frame B).

In this manner, in the present embodiment, the own vehicle C is parked in the vacant parking frame B that is detected while the own vehicle C is travelling to the target parking frame, the own vehicle C is accordingly able to be parked earlier than the case where the own vehicle C is parked in the vacant parking frame A, so that it is possible to improve the parking efficiency of the own vehicle C in the parking lot 200.

In the present embodiment, a travelling distance of the own vehicle C becomes shorter than that in a case where the own vehicle C is parked in the vacant parking frame A, so that it is possible to reduce the fuel consumption.

In the present embodiment, a target parking frame is changed into the vacant parking frame B that is detected in the middle of the travelling, and thus the parked vehicles Cx are parked near the entrance 230 in a bunch to some extent, for example. Thus, the parking lot 200 is able to be managed more easily in terms of the maintenance such as security compared with a case where the parked vehicles Cx exist dispersedly in the parking lot 200, for example.

1.2. Overall Configuration of Parking Control System

Figure 2:
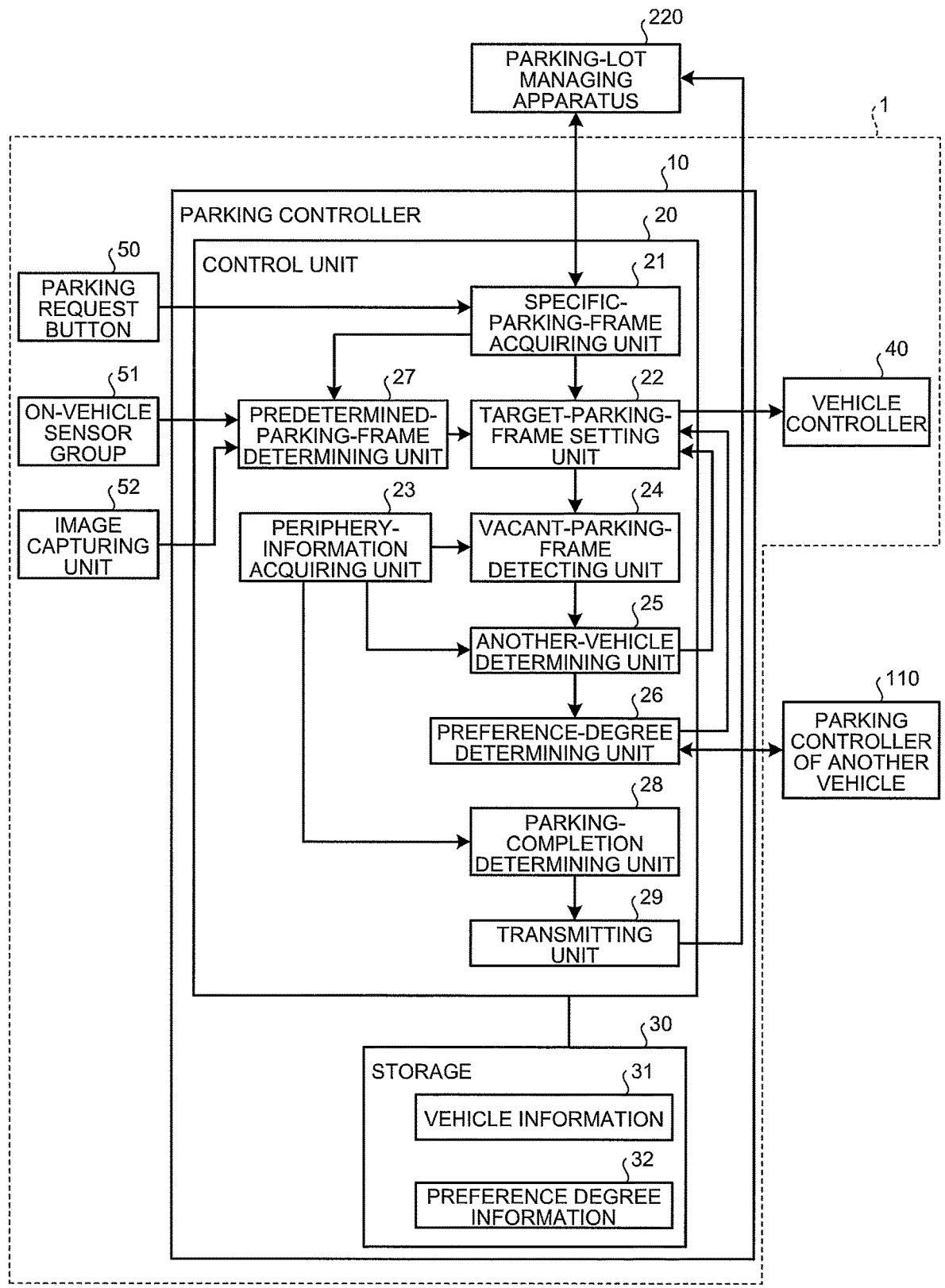
FIG. 2 is a block diagram illustrating a configuration example the overall including a parking control system.

Next, an overall configuration including the parking control system 1 according to the first embodiment will be explained with reference to FIG. 2. FIG. 2 is a block diagram illustrating a configuration example of the overall including the parking control system 1.

As illustrated in FIG. 2, the parking control system 1 includes the above-mentioned parking controller 10, the vehicle controller 40, a parking request button 50, an on-vehicle sensor group 51, and an image capturing unit 52.

The parking request button 50 is provided in a key of the own vehicle C, for example, and outputs to the parking controller 10 a parking request signal indicating a request for parking by autonomous driving control when a user operates the parking request button 50 after getting out of the own vehicle C.

The on-vehicle sensor group 51 includes various devices for detecting information needed for, for example, a detection process of a vacant parking frame, a determination process of presence/absence of another vehicle, and a determination process of parking completion among other things, which will be mentioned later. For example, the on-vehicle sensor group 51 includes: not limited thereto, a GPS reception apparatus that detects a present position of the own vehicle C on the basis of signals transmitted from a GPS satellite; a radar that radiates electromagnetic waves toward the periphery and acquires reflection waves so as to measure presence/absence of a target object such as another vehicle, a distance to the target object, a direction toward the target object, etc. The on-vehicle sensor group 51 outputs to the parking controller 10 the information on the present position of the own vehicle C, that on the presence/absence of the target object such as another vehicle, etc.

The image capturing unit 52 is a camera that captures an outer side (periphery) of the own vehicle C. The image capturing unit 52 outputs captured image information on the periphery of the own vehicle C to the parking controller 10.

The parking controller 10 includes a control unit 20 and a storage 30. The parking controller 10 is able to communicate with a parking controller 110 to be mentioned later (see FIG. 3) of another vehicle Ca, in addition to the above-mentioned parking-lot managing apparatus 220 and is able to perform vehicle-to-vehicle communication. This point will be mentioned later.

The control unit 20 includes a specific-parking-frame acquiring unit 21, a target-parking-frame setting unit 22, a periphery-information acquiring unit 23, a vacant-parking-frame detecting unit 24, an another-vehicle determining unit 25, a preference-degree determining unit 26, a predetermined-parking-frame determining unit 27, a parking-completion determining unit 28, and a transmitting unit 29. The control unit 20 is a microcomputer including a central processing unit (CPU) etc., for example.

The storage 30 is a storage constituted of a storage device such as a non-volatile memory and a hard disc drive, and stores vehicle information 31 and preference degree information 32.

A parking request signal transmitted from the above-mentioned parking request button 50 is input to the specific-parking-frame acquiring unit 21. When the parking request signal is input, the specific-parking-frame acquiring unit 21 reads the vehicle information 31 stored in the storage 30, and transmits, to the parking-lot managing apparatus 220, the vehicle information 31 and a signal for requesting information on a specific parking frame. The vehicle information 31 includes, not limited thereto, information on a vehicle size and a vehicle type among other things of the own vehicle C, for example.

When the vehicle information 31 and the signal for requesting information on the specific parking frame are input, the parking-lot managing apparatus 220 transmits, to the own vehicle C, information on the specific parking frame on the basis of the vehicle information 31 etc. as described above.

The specific-parking-frame acquiring unit 21 acquires information on the specific parking frame transmitted from the parking-lot managing apparatus 220, and outputs this information on the specific parking frame to the target-parking-frame setting unit 22 and the predetermined-parking-frame determining unit 27.

When information on the specific parking frame is input, the target-parking-frame setting unit 22 sets the specific parking frame to be a target parking frame. The target-parking-frame setting unit 22 outputs, to the vehicle controller 40, information indicating the set target parking frame.

When the information on the target parking frame is input, the vehicle controller 40 performs autonomous driving control to the target parking frame. For example, the vehicle controller 40 computes a route from a present position of the own vehicle C to the target parking frame. Information sent from the on-vehicle sensor group 51 and the image capturing unit 52 is input to the vehicle controller 40, the vehicle controller 40 causes the own vehicle C to autonomously travel to the target parking frame on the basis of this information and the computed route.

When the own vehicle C reaches the vicinity of the target parking frame, for example, the vehicle controller 40 analyzes image information sent from the image capturing unit 52 to detect a frame line of the target parking frame, and controls the own vehicle C so that the own vehicle C stops to be parked in the frame line.

The information obtained by the on-vehicle sensor group 51 and the image capturing unit 52 is input to the periphery-information acquiring unit 23. The periphery-information acquiring unit 23 outputs the input information to the vacant-parking-frame detecting unit 24, the another-vehicle determining unit 25, and the parking-completion determining unit 28.

The vacant-parking-frame detecting unit 24 detects a vacant parking frame while the own vehicle C is travelling to the target parking frame caused by autonomous travel controlled by the vehicle controller 40. For example, the vacant-parking-frame detecting unit 24 analyzes image information captured, by the image capturing unit 52, during the travelling of the own vehicle C so as to detect a vacant parking frame among the parking frames 210 along the route. The vacant-parking-frame detecting unit 24 outputs information indicating a detection result of the vacant parking frame to the target-parking-frame setting unit 22 and the another-vehicle determining unit 25.

When the vacant-parking-frame detecting unit 24 detects no vacant parking frame, the target-parking-frame setting unit 22 does not change the target parking frame. In other words, the autonomous travel performed on the own vehicle C to the target parking frame, which is set at the entrance 230 (see FIG. 1) of the parking lot 200, is maintained.

When the vacant-parking-frame detecting unit 24 detects a vacant parking frame, the another-vehicle determining unit 25 determines whether or not there exists the travelling other vehicle Ca around the vacant parking frame on the basis of information sent from the on-vehicle sensor group 51 and the image capturing unit 52, for example.

The "travelling other vehicle" means the other vehicle Ca (see FIG. 3) that is travelling by autonomous driving to a target parking frame that is different from the target parking frame of the own vehicle C, for example. The "travelling" in this description is not limited to a state where the own vehicle C or the other vehicle Ca is physically moving, for example, a state where the own vehicle C or the other vehicle Ca is stopped is included in the "travelling" only if the own vehicle C or the other vehicle Ca is on the way to its target parking frame.

The another-vehicle determining unit 25 outputs information indicating a determination result of whether or not there exists the travelling other vehicle Ca to the target-parking-frame setting unit 22 and the preference-degree determining unit 26.

When the another-vehicle determining unit 25 determines that there does not exist the other vehicle Ca, the target-parking-frame setting unit 22 changes the target parking frame into the vacant parking frame. The target-parking-frame setting unit 22 outputs information indicating the changed target parking frame to the vehicle controller 40.

The vehicle controller 40 computes again a route to a changed target parking frame, and causes the own vehicle C to autonomously travel to the target parking frame on the basis of the computed route so as to park the own vehicle C (see lower part of FIG. 1).

In this manner, in the present embodiment, when a vacant parking frame is detected while the own vehicle C is travelling to the first set target parking frame, the target parking frame is changed into the detected vacant parking frame, the own vehicle C is accordingly able to be parked earlier than the case where the own vehicle C is parked in the first set target parking frame, so that it is possible to improve the parking efficiency of the own vehicle C in the parking lot 200.

When the another-vehicle determining unit 25 determines that there exists the other vehicle Ca, the preference-degree determining unit 26 determines preference degrees, of the own vehicle C and the other vehicle Ca, for the vacant parking frame on the basis of the preference degree information 32. As described in the following, a target parking frame of one of the own vehicle C and the other vehicle Ca that is determined to have a higher preference degree is changed into the vacant parking frame.

Meanwhile, preference degree determination to be performed by the preference-degree determining unit 26 will be explained with reference to FIG. 3 and the like. FIG. 3 is a diagram illustrating the preference degree determination that is performed by the preference-degree determining unit 26. In FIG. 3, a case is exemplified in which the vacant-parking-frame detecting unit 24 detects the vacant parking frame B and the another-vehicle determining unit 25 determines that there exists the other vehicle Ca around the vacant parking frame B.

As illustrated in FIG. 3, when the other vehicle Ca is determined to exist around the vacant parking frame B and a competition occurs with respect to parking in the vacant parking frame B, the preference-degree determining unit 26 (see FIG. 2) of the parking controller 10 acquires the preference degree information 32 of the own vehicle C stored in the storage 30. The preference-degree determining unit 26 performs vehicle-to-vehicle communication with the parking controller 110 of the other vehicle Ca to acquire the preference degree information 32 of the other vehicle Ca.

FIG. 4 is a diagram illustrating one example of the preference degree information 32, of the own vehicle C and the other vehicle Ca, acquired by the preference-degree determining unit 26.

As illustrated in FIG. 4, the preference degree information 32 includes acquisition time point information on a time point at which information indicating a specific parking frame is acquired from the parking-lot managing apparatus 220, distance information on a distance from a present position to a vacant parking frame, vehicle-size information, number-of-occupants information, information on the number of use times of the parking lot 200, and information on use frequency of the parking lot 200 among other things. The information on the number of use times and the information on use frequency of the parking lot 200 are one example of use history information of the parking lot 200.

The preference-degree determining unit 26 compares acquisition time point information of the own vehicle C and that of the other vehicle Ca with each other to be able to determine that the vehicle having the earlier acquisition time point has a higher preference degree, for example. In other words, the vehicle, of the own vehicle C and the other vehicle Ca, having the earlier acquisition time point entered the parking lot 200 earlier, and the preference-degree determining unit 26 accordingly determines that the vehicle having the earlier acquisition time point has the higher preference degree so as to change its target parking frame into a vacant parking frame. Thus, parking is performed in the order of entrance into the parking lot 200, so that it is possible to improve the parking efficiency of the own vehicle C and the other vehicle Ca in the parking lot 200.

The preference-degree determining unit 26 compares pieces of distance information of the own vehicle C and the other vehicle Ca with each other to be able to determine that the vehicle having the shorter distance has a higher preference degree, for example. In other words, the vehicle, of the own vehicle C and the other vehicle Ca, having the shorter distance to the vacant parking frame is able to be parked earlier, the preference-degree determining unit 26 accordingly determines that the vehicle having the shorter distance has a higher preference degree so as to change its target parking frame into a vacant parking frame. Thus, the own vehicle C and the other vehicle Ca in the parking lot 200 are able to be parked early as much as possible, so that it is possible to improve the parking efficiency.

The preference-degree determining unit 26 compares pieces of information on vehicle sizes of the own vehicle C and the other vehicle Ca with each other to be able to determine that the vehicle having a vehicle size appropriate for the vacant parking frame has a higher preference degree. In other words, depending on the parking lot 200, the number of parking frames for large-sized vehicles is comparatively small in some cases, for example. In this case, when the large-sized own vehicle C and the small-sized other vehicle Ca compete with each other for a vacant parking frame that is for a large-sized vehicle, the preference-degree determining unit 26 determines that the own vehicle C has a higher preference degree so as to change its target parking frame into a vacant parking frame. Thus, the own vehicle C and the other vehicle Ca are able to be parked, in the parking lot 200, in the parking frames 210 having respective appropriate vehicle sizes, so that it is possible to improve the parking efficiency.

The preference-degree determining unit 26 compares pieces of number-of-occupants information of the own vehicle C and the other vehicle Ca to be able to determine that the vehicle having the larger number of occupants has a higher preference degree, for example. In other words, when an entrance and an exit of the parking lot 200 are adjacent to each other, the vehicle parked in the parking frame 210 closer to the entrance is able to rapidly reach the exit when the vehicle goes out of the parking lot, for example. Thus, the preference-degree determining unit 26 determines that the own vehicle C having the large number of occupants has a high preference degree so as to change its target parking frame into the vacant parking frame, for example. Thus, a waiting time interval of the outgoing own vehicle C having the larger number of occupants is able to be shortened, so that it is possible to improve the parking efficiency while affording feeling of satisfaction to many occupants.

The preference-degree determining unit 26 compares pieces of information on the number of use times or those of information on use frequency, of the parking lot 200, of the own vehicle C and the other vehicle Ca with each other to be able to determine that the vehicle having the larger number of use times or the greater use frequency has a higher preference degree, for example. In other words, the preference-degree determining unit 26 determines that the own vehicle C having the larger number of use times and the like has a higher preference degree so as to change its target parking frame into a vacant parking frame, for example. Thus, a waiting time interval of the outgoing own vehicle C of a user having the large number of use times or a large use frequency is able to be shortened, so that it is possible to improve the parking efficiency while affording feeling of satisfaction to the user.

The preference-degree determining unit 26 may perform the preference degree determination on the basis of one of various pieces of the preference degree information 32, or may combine various pieces of the preference degree information 32 so as to determine the preference degrees.

The preference degree information 32 may be stored in association with determination orders. The determination orders indicate preference orders between various pieces of information stored as the preference degree information 32. In other words, when a time point of the own vehicle C and that of the other vehicle Ca are the same with respect to the acquisition time point information whose determination order is the first place, the preference-degree determining unit 26 may compare pieces of the distance information whose determination order is the second place so as to determine the preference degrees, for example.

Thus, in the preference-degree determining unit 26 according to the present embodiment, it is possible to reliably determine preference degrees of the own vehicle C and the other vehicle Ca. In FIG. 4, various kinds of information and specific numeric values of the determination orders, which are stored as the preference degree information 32, are depicted; however, they are merely one example and not limited thereto.

In the above description, the preference-degree determining unit 26 directly acquires the preference degree information 32 from the other vehicle Ca; however, not limited thereto, the preference degree information 32 of the other vehicle Ca may be acquired from the parking-lot managing apparatus 220 or the like, for example.

The preference-degree determining unit 26 outputs, to the target-parking-frame setting unit 22, information that indicates the above-performed determination result of the preference degrees. The target-parking-frame setting unit 22 sets a target parking frame on the basis of the determination result of the preference-degree determining unit 26.

Specifically, when a preference degree of the own vehicle C for a vacant parking frame is higher than that of the other vehicle Ca, the target-parking-frame setting unit 22 changes its target parking frame into a vacant parking frame. In other words, when a preference degree of the own vehicle C is lower than that of the other vehicle Ca, the target-parking-frame setting unit 22 does not change its target parking frame into a vacant parking frame.

Thus, the vehicle, of the own vehicle C and the other vehicle Ca, having a higher preference degree is to be parked in a vacant parking frame, so that it is possible to improve the parking efficiency, in the parking lot 200, of the own vehicle C and the other vehicle Ca.

The preference-degree determining unit 26 may output, to the parking controller 110 of the other vehicle Ca, information indicating a determination result of the preference degrees. Thus, the own vehicle C and the other vehicle Ca are able to share the determination result of the preference degrees, so that it is possible to smoothly park the vehicle having a higher preference degree in a vacant parking frame.

As described above, information on the specific parking frame is input to the predetermined-parking-frame determining unit 27 from the specific-parking-frame acquiring unit 21. The predetermined-parking-frame determining unit 27 determines whether or not the specific parking frame set as a target parking frame is a predetermined parking frame that satisfies a predetermined condition. Meanwhile, the predetermined condition includes, for example, a condition that the specific parking frame is the parking frame 210 specified by a user, etc.

Specifically, for example, in a case of the incoming into the parking lot 200, when a user requests the parking-lot managing apparatus 220 to manage parking in a specific area (for example, in the vicinity of specific exit) of the parking lot 200, the parking-lot managing apparatus 220 specifies the parking frame 210 in the specific area as a specific parking frame. Thus, the target-parking-frame setting unit 22 sets the specific parking frame to be a target parking frame, and autonomous driving control to the target parking frame is performed.

In this case, if a vacant parking frame is detected while the own vehicle C is travelling to the target parking frame, because the target parking frame is a specific parking frame specified by the user, it is preferable that such an above-mentioned process that changes the target parking frame into the vacant parking frame is not executed.

Hence, in the present embodiment, first, the predetermined-parking-frame determining unit 27 is configured to determine whether or not the specific parking frame is the predetermined parking frame. The predetermined-parking-frame determining unit 27 outputs information indicating the determination result to the target-parking-frame setting unit 22.

When the vacant-parking-frame detecting unit 24 detects a vacant parking frame and the predetermined-parking-frame determining unit 27 determines that the specific parking frame is the predetermined parking frame, the target-parking-frame setting unit 22 forbids changing the target parking frame into the vacant parking frame.

Thus, in the present embodiment, for example, when the specific parking frame specified by a user is a target parking frame, changing of the target parking frame into a vacant parking frame is forbidden, so that it is possible to improve the parking efficiency while satisfying the request of the user.

The parking-completion determining unit 28 determines whether or not parking of the own vehicle C in the target parking frame has completed on the basis of information from the on-vehicle sensor group 51 and the image capturing unit 52 that is input from the periphery-information acquiring unit 23. When determining that the parking of the own vehicle C in the target parking frame has completed, the parking-completion determining unit 28 outputs, to the transmitting unit 29, a completion signal indicating the completion of the parking. The "completion of the parking" in this description means, not limited thereto, that the own vehicle C is stopped in a frame line of the target parking frame, for example.

When the parking-completion determining unit 28 determines that the parking in the target parking frame has completed and the completion signal is input, the transmitting unit 29 transmits, to the parking-lot managing apparatus 220, information indicating the target parking frame in which the own vehicle C has parked.

Thus, the parking-lot managing apparatus 220 is able to acquire in an early stage information indicating that the own vehicle C is parked in the target parking frame transmitted from the transmitting unit 29, and thus is able to always acquire precise information on vacant situations of the parking frames 210 in the parking lot 200.

1.3. Control Process of Parking Controller According to First Embodiment

Next, a specific processing procedure in the parking controller 10 will be explained with reference to FIG. 5 and the following. FIG. 5 is a flowchart illustrating a procedure for a parking control process to be executed by the parking controller 10.

As illustrated in FIG. 5, the control unit 20 of the parking controller 10 executes a process for setting a target parking frame (Step S10). FIG. 6 is a flowchart illustrating a procedure for a target-parking-frame setting process.

As illustrated in FIG. 6, the control unit 20 transmits vehicle information of the own vehicle C to the parking-lot managing apparatus 220 (Step S100). Next, the control unit 20 acquires information on a specific parking frame transmitted from the parking-lot managing apparatus 220 (Step S101).

Subsequently, the control unit 20 sets the specific parking frame as a target parking frame (Step S102). Next, the control unit 20 determines whether or not a vacant parking frame is detected while the own vehicle C is travelling to the target parking frame (Step S103).

When no vacant parking frame is determined to be detected (Step S103: No), the control unit 20 outputs, to the vehicle controller 40, information on the target parking frame set in Step S102 (Step S104). Thus, the own vehicle C is controlled by the vehicle controller 40 to autonomously drive to and park in the target parking frame.

On the other hand, when a vacant parking frame is determined to be detected (Step S103: Yes), the control unit 20 determines whether or not the specific parking frame set as the target parking frame is a predetermined parking frame (Step S105).

When the specific parking frame is determined not to be a predetermined parking frame (Step S105: No), the control unit 20 determines whether or not there exists the travelling other vehicle Ca around the vacant parking frame (Step S106).

When the other vehicle Ca is determined to exist around the vacant parking frame (Step S106: Yes), the control unit 20 determines preference degrees of the own vehicle C and the other vehicle Ca for the vacant parking frame (Step S107).

Next, the control unit 20 determines whether or not the preference degree of the own vehicle C is higher than that of the other vehicle Ca (Step S108). When the preference degree of the own vehicle C is higher than that of the other vehicle Ca (Step S108: Yes), the control unit 20 changes the target parking frame into the vacant parking frame (Step S109).

The control unit 20 proceeds to Step S104, and outputs information on the changed target parking frame to the vehicle controller 40. Thus, the own vehicle C is parked in the target parking frame changed by the vehicle controller 40.

On the other hand, when the preference degree of the own vehicle C is lower than that of the other vehicle Ca (Step S108: No), the control unit 20 skips Step S109 not to change the target parking frame into the vacant parking frame, in other words, keeps the target parking frame set in Step S102.

Meanwhile, when the preference degree of the own vehicle C is lower than that of the other vehicle Ca, the target parking frame is kept, the vehicle controller 40 causes the own vehicle C to travel to the target parking frame, in this case, there exists a case where parking of the other vehicle Ca, having the higher preference degree, into the vacant parking frame is started and this parking of the other vehicle Ca becomes an object to the travelling of the own vehicle C to the target parking frame. In this case, the vehicle controller 40 may cause the own vehicle C to stop until the other vehicle Ca is not an object to the travelling of the own vehicle C to the target parking frame, and then may cause the own vehicle C to travel to the target parking frame.

The explanation of FIG. 6 will be continued. When the other vehicle Ca is determined not to exist around the vacant parking frame (Step S106: No), the control unit 20 proceeds to Step S109 so as to change the target parking frame into the vacant parking frame.

When the specific parking frame is determined to be a predetermined parking frame (Step S105: Yes), the control unit 20 forbids changing the target parking frame into the vacant parking frame (Step S110).

Returning to FIG. 5, the control unit 20 executes a parking completion process of the own vehicle C to the target parking frame (Step S11). FIG. 7 is a flowchart illustrating a procedure for a parking completion process.

As illustrated in FIG. 7, the control unit 20 determines whether or not parking of the own vehicle C into a target parking frame has been completed (Step S200). When the parking of the own vehicle C into the target parking frame is determined to be completed (Step S200: Yes), the control unit 20 transmits, to the parking-lot managing apparatus 220, information indicating the target parking frame in which the own vehicle C is parked (Step S201).

On the other hand, when the parking of the own vehicle C into the target parking frame is determined not to be completed (Step S200: No), the control unit 20 skips Step S201 to terminate the process.

As described above, the parking controller 10 according to the first embodiment includes the specific-parking-frame acquiring unit 21, the target-parking-frame setting unit 22, and the vacant-parking-frame detecting unit 24. The specific-parking-frame acquiring unit 21 acquires information indicating a specific parking frame. The specific parking frame is a parking frame that is specified by the parking-lot managing apparatus 220 (one example of external device) among from the plurality of parking frames 210 in the parking lot 200. The target-parking-frame setting unit 22 sets the specific parking frame as a target parking frame. The target parking frame is a parking frame to be a target.

The vacant-parking-frame detecting unit 24 detects a vacant parking frame while the own vehicle C is travelling to the target parking frame. The vacant parking frame is a parking frame in a vacant state. The target-parking-frame setting unit 22 changes, when the vacant-parking-frame detecting unit 24 detects the vacant parking frame, the set target parking frame into the vacant parking frame. Thus, it is possible to improve the parking efficiency of vehicles in the parking lot.

As illustrated in FIG. 7, also after the set target parking-frame is changed into this vacant parking-frame, the control unit 20 determines whether or not parking of the own vehicle C into the target parking frame is completed (Step S200). When the parking of the own vehicle C into the changed target parking frame is determined to be completed (Step S200: Yes), the control unit 20 transmits to the parking-lot managing apparatus 220 information indicating the target parking frame in which the own vehicle C is parked in other words, the changed target parking frame (Step S201). Thus, the parking-lot managing apparatus 220 is able to recognize the fact that the own vehicle C is parked in a parking frame that is different from the specific parking frame. Hence, the parking-lot managing apparatus 220 does not set, for another vehicle, the parking-frame in which the own vehicle C is parked as a specific parking frame.

Figure 8:
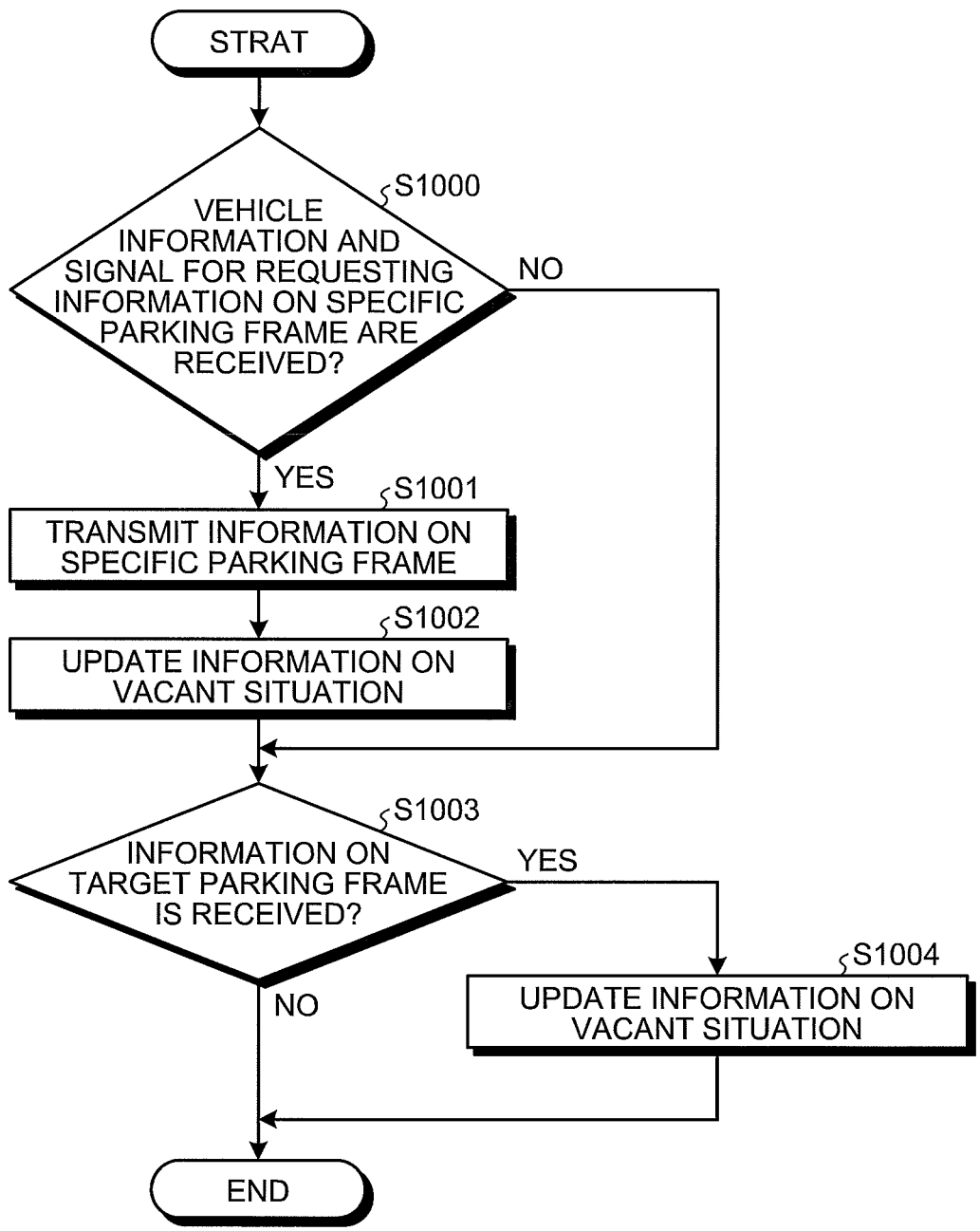
FIG. 8 is a flowchart illustrating a procedure for a parking control process to be executed by a parking-lot managing apparatus.

One example of the control process of the parking-lot managing apparatus 220 will be explained with reference to FIG. 8. FIG. 8 is a flowchart illustrating a procedure for a parking control process to be executed by the parking-lot managing apparatus 220.

As illustrate in FIG. 8, the parking-lot managing apparatus 220 determines whether or not the parking-lot managing apparatus 220 receives from the own vehicle C vehicle information and a signal for requesting information on a specific parking frame (Step S1000). When determining that the parking-lot managing apparatus 220 receives the vehicle information and the like (Step S1000: Yes), the parking-lot managing apparatus 220 transmits to the own vehicle C information on the specific parking frame on the basis of the information on the vehicle information, the vacant situation, etc. (Step S1001).

Next, the parking-lot managing apparatus 220 updates information on the vacant situation of the parking lot 200 (Step S1002). Specifically, the own vehicle C is to be parked in the specific parking frame whose information is transmitted to the own vehicle C, the parking-lot managing apparatus 220 updates the information on the vacant situation so that the information on the vacant situation includes information indicating that the own vehicle C is to be parked in this specific parking frame. Thus, it is possible for the parking-lot managing apparatus 220 not to set, for another vehicle, the specific parking frame whose information is transmitted to the own vehicle C as a specific parking frame.

When the vehicle information and the like is determined not to be received (Step S1000: No), the parking-lot managing apparatus 220 skips the processes of the above-mentioned Steps S1001 and S1002.

Next, the parking-lot managing apparatus 220 determines whether or not the parking of the own vehicle C is completed and the parking-lot managing apparatus 220 receives, from the own vehicle C, information indicating the parked target parking frame (Step S1003).

When information indicating the target parking frame is determined to be received (Step S1003: Yes), the parking-lot managing apparatus 220 updates the information on the vacant situation (Step S1004). Specifically, the parking-lot managing apparatus 220 updates the information on the vacant situation so that the received target parking frame is excluded from information on vacant parking frames that is included in the information on the vacant situation. Thus, as already described above, the parking-lot managing apparatus 220 does not set, for another vehicle, a parking frame in which the own vehicle C is parked as a specific parking frame.

On the other hand, when the information indicating the target parking frame is determined not to be received (Step S1003: No), the parking-lot managing apparatus 220 skips Step S1004 to terminate the process.

1.4. First Modification

Next, a parking control process to be executed by the parking controller 10 according to a first modification will be explained. When changing the set target parking frame into the detected vacant parking frame, for example, the parking controller 10 according to the first modification is configured to transmit, to the parking-lot managing apparatus 220, information on the parking frames that includes information on the changed target parking frame.

Figure 9:
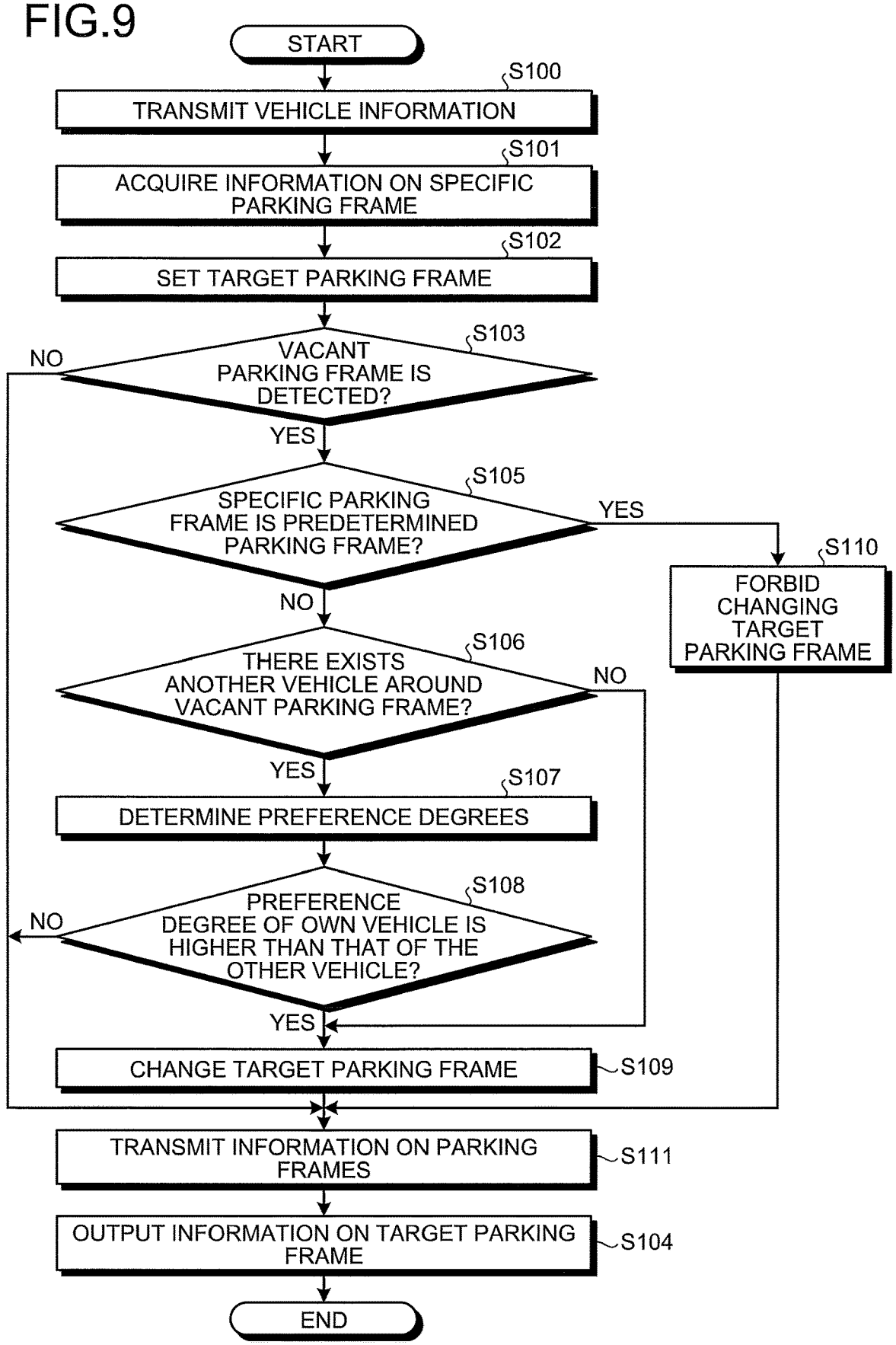
FIG. 9 is a flowchart illustrating a procedure for a target-parking-frame setting process according to a first modification.
Figure 10:
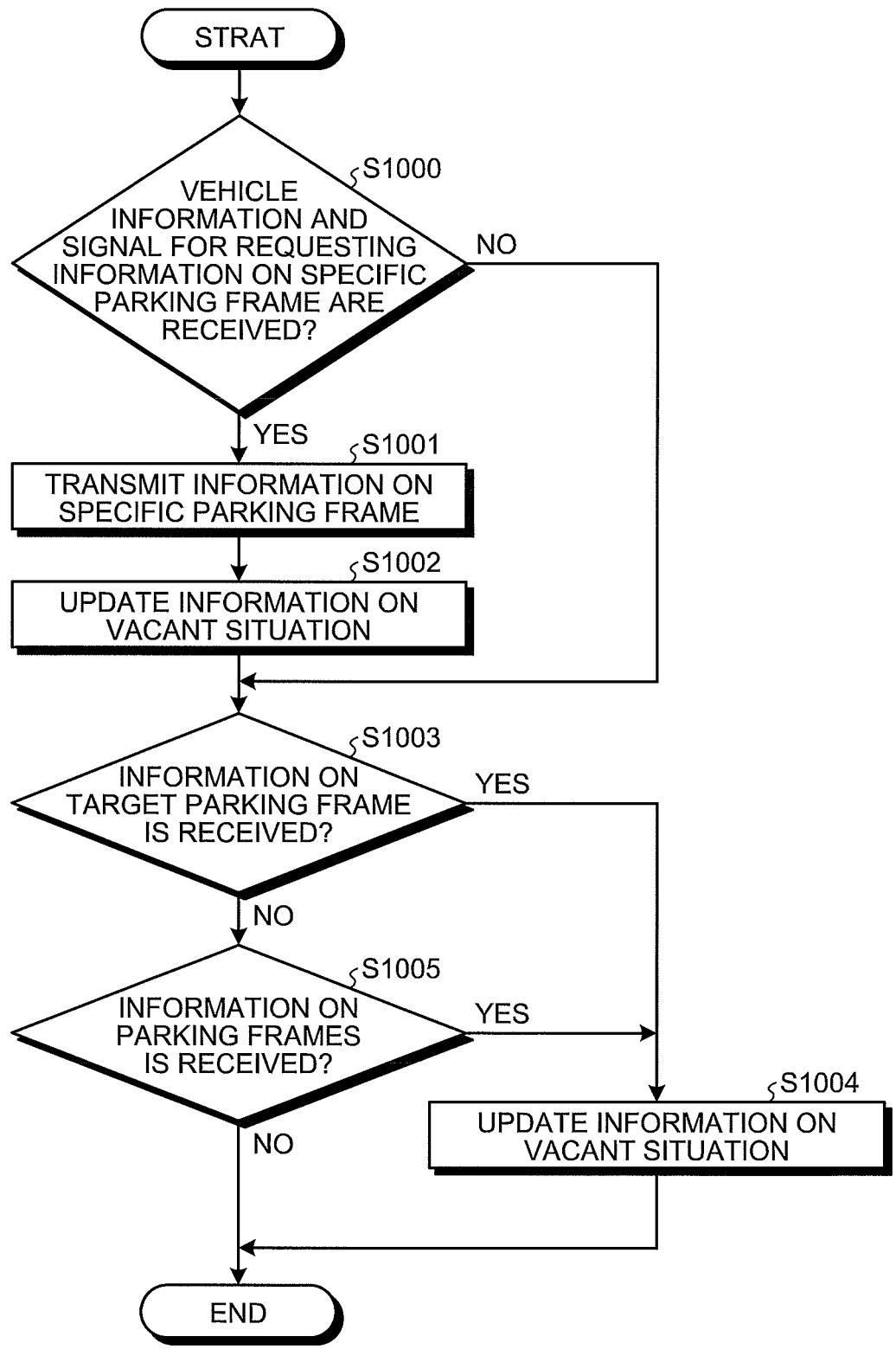
FIG. 10 is a flowchart illustrating a procedure for a parking control process to be executed by a parking-lot managing apparatus according to the first modification.
Figure 11:
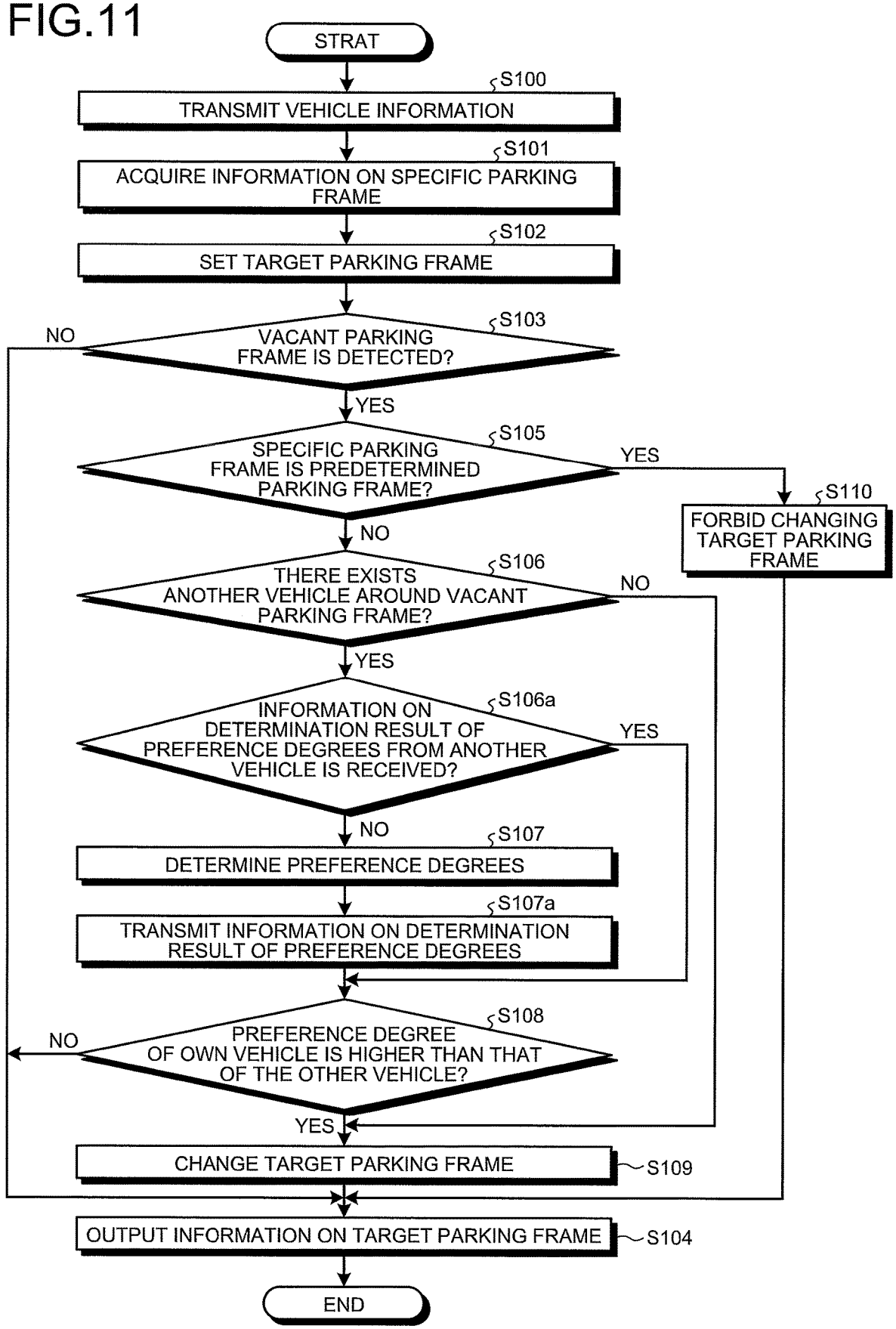
FIG. 11 is a flowchart illustrating a procedure for a target-parking-frame setting process according to a second modification.

FIG. 9 is a flowchart illustrating a procedure for the target-parking-frame setting process according to the first modification. In FIG. 9 and FIGS. 10 and 11 to be mentioned later, processes that are the same as those according to the first embodiment are presented with the same Step numbers and description thereof is appropriately omitted.

As illustrated in FIG. 9, the control unit 20 of the parking controller 10 executes the processes of Steps S100 to S110 so as to execute the process for setting the target parking frame of the own vehicle C. For example, the control unit 20 executes the process for changing the set target parking frame into the detected vacant parking frame, or executes the process for not changing the target parking frame even when the vacant parking frame is detected.

The control unit 20 transmits, to the parking-lot managing apparatus 220, information on parking frames (Step S111). The above-mentioned information on parking frames includes, but not limited thereto, for example, information on the changed target parking frame, information on the vacant parking frame that is not changed into the target parking frame when the target parking frame is not changed, etc. The control unit 20 executes the process of Step S104 after executing the process of Step S111.

Next, a control process of the parking-lot managing apparatus 220 to which the information on parking frame is transmitted will be explained with reference to FIG. 10. FIG. 10 is a flowchart illustrating a procedure for the parking control process to be executed by the parking-lot managing apparatus 220 according to the first modification.

As illustrate in FIG. 10, when the information indicating the parked target parking frame is not determined to be received after executing the processes of Steps S1000 to S1002 (Step S1003: No), the parking-lot managing apparatus 220 determines whether or not receiving the information on parking frames from the own vehicle C (Step S1005).

When the information on parking frames is determined to be received (Step S1005: Yes), the parking-lot managing apparatus 220 updates the information on the vacant situation (Step S1004). Specifically, for example, when the information on parking frames includes information on the changed target parking frame, the own vehicle C is to be parked in the changed target parking frame, and thus the parking-lot managing apparatus 220 updates the information on the vacant situation so that the information on the vacant situation includes information indicating that the own vehicle C is to be parked in the changed target parking frame. Hence, the parking-lot managing apparatus 220 is able to set, for another vehicle, the changed target parking frame as a specific parking frame.

The own vehicle C is not parked in a target parking frame before the change and the target parking frame becomes a vacant parking frame, and thus the parking-lot managing apparatus 220 updates the information on the vacant situation so that the information on the vacant situation includes the target parking frame before the change as a vacant parking frame. Thus, the parking-lot managing apparatus 220 is able to set, for another vehicle, the target parking frame before the change that becomes a vacant parking frame as a specific parking frame, so that it is possible to improve the parking efficiency of vehicles in the parking lot.

When the information on parking frames includes information on the vacant parking frame that is not changed into a target parking frame, the parking-lot managing apparatus 220 updates the information on the vacant situation so that the information on the vacant situation includes the vacant parking frame detected by the own vehicle C. Thus, in the first modification, it is possible to immediately reflect the vacant parking frame that is detected by the own vehicle C on the information on the vacant situation.

On the other hand, when the information on the parking frames is not determined to be received (Step S1005: No), the parking-lot managing apparatus 220 skips Step S1004 to terminate the process.

1.5. Second Modification

Next, a parking control process to be executed by the parking controller 10 according to a second modification will be explained. The parking controller 10 according to the second modification is configured to transmit, after determining preference degrees of the own vehicle C and the other vehicle Ca, information indicating a determination result of the preference degrees to the parking controller 110 of the other vehicle Ca, for example. When receiving information indicating the determination result of the preference degrees from the parking controller 110 of the other vehicle Ca before determining the preference degrees by itself, the parking controller 10 determines whether or not the preference degree of the own vehicle C is higher than that of the other vehicle Ca on the basis of the information indicating the received determination result, for example, so as to set a target parking frame. Thus, it is possible to reduce a processing load of the parking controller 10 etc. Hereinafter, details of the second modification will be explained with reference to FIG. 11.

FIG. 11 is a flowchart illustrating a procedure for the target-parking-frame setting process according to the second modification. As illustrated in FIG. 11, when executing the processes of Steps S100 to S106 to determine that there exists the other vehicle Ca in the periphery (Step S106: Yes), the control unit 20 of the parking controller 10 determines whether or not the control unit 20 receives the information indicating the determination result of the preference degrees from the parking controller 110 of the other vehicle Ca (Step S106a).

When determining that the information indicating the determination result of the preference degrees is not received from the other vehicle Ca (Step S106a: No), the control unit 20 proceeds to Step S107 so as to determine the preference degrees, for the vacant parking frame, of the own vehicle C and the other vehicle Ca.

The preference-degree determining unit 26 (see FIG. 2) of the control unit 20 transmits, to the parking controller 110 of the other vehicle Ca, information indicating the determination result of the preference degrees (Step S107a). Thus, for example, when the parking controller 110 of the other vehicle Ca does not determine the preference degrees, the parking controller 110 of the other vehicle Ca does not execute the process for determining the preference degrees by itself, and thus it is possible to set a target parking frame by using the determination result of the received preference degrees to be able to reduce a processing load.

On the other hand, when determining that the information indicating the determination result of the preference degrees is received from the other vehicle Ca (Step S106a: Yes), the control unit 20 skips Steps S107 and S107a to proceed to Step S108 and the following, and sets a target parking frame by using the determination result of the preference degrees that is received from the other vehicle Ca. In this manner, when receiving the information indicating the determination result of the preference degrees from the other vehicle Ca, the preference-degree determining unit 26 (see FIG. 2) of the control unit 20 does not execute the process for determining the preference degrees by itself. The control unit 20 sets a target parking frame by using the determination result of the preference degrees that is received from the other vehicle Ca, so that it is possible to more reduce a processing load compared with a case where the control unit 20 executes the process for determining the preference degrees by itself.

In the above-mentioned first embodiment and modifications, the vehicle controller 40 computes a route from the own vehicle C to a target parking frame, not limited thereto, the parking controller 10 or the parking-lot managing apparatus 220 may compute the route.

In the aforementioned, the vacant-parking-frame detecting unit 24 detects a vacant parking frame on the basis of image information of the image capturing unit 52; however, not limited thereto. For example, the vacant-parking-frame detecting unit 24 may perform vehicle-to-vehicle communication with the outgoing parked vehicle Cx1 (see middle part of FIG. 1), and may acquire outgoing information indicating its going out of the parking lot from the outgoing parked vehicle Cx1 so as to detect the vacant parking frame.

The parking in the above-mentioned parking lot 200 is performed after a driver got out of a vehicle; however, not limited thereto, may be performed in a state where a driver is in a vehicle, for example.

2. Second Embodiment 2.1. Outline of Outgoing Control Method

Figure 12:
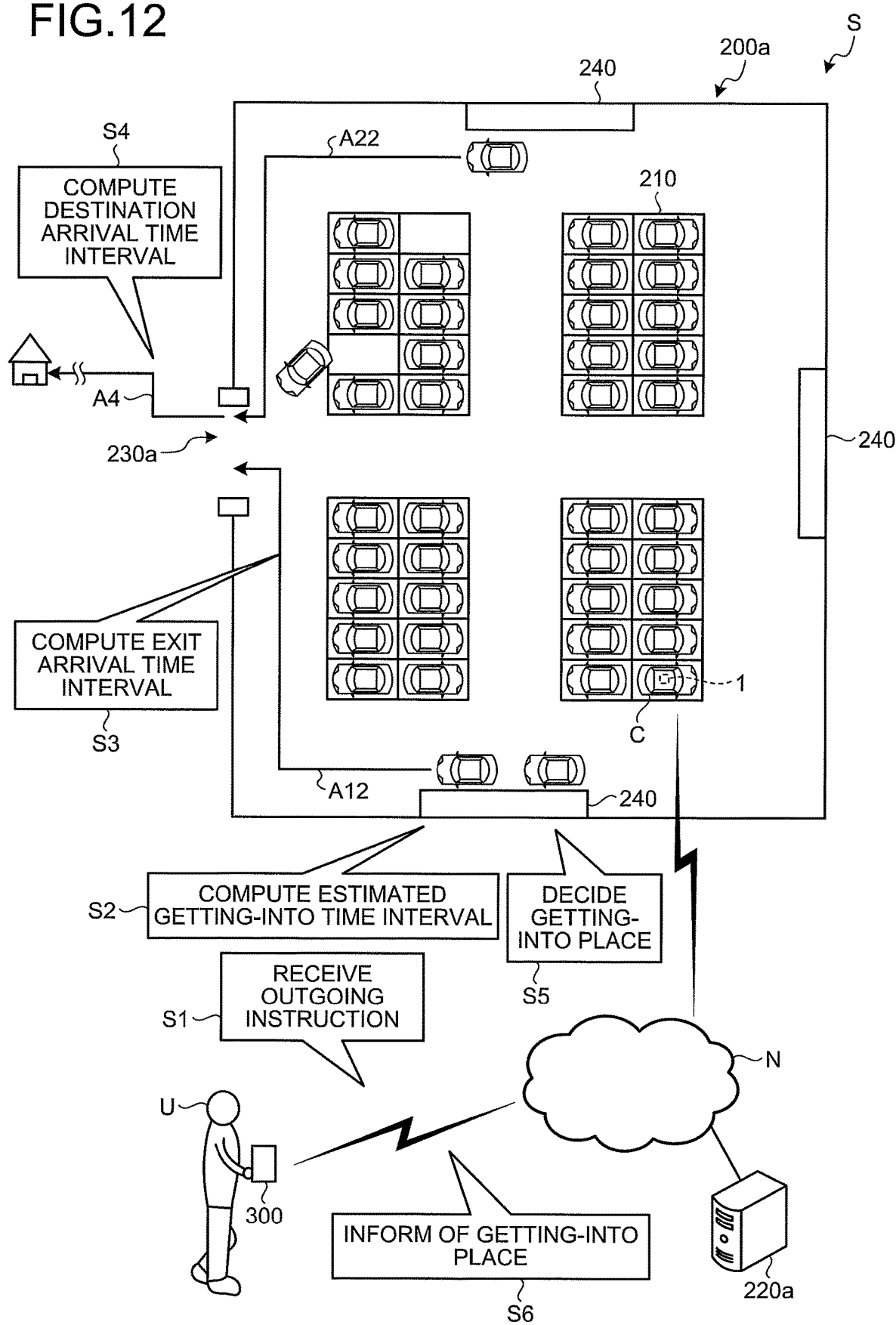
FIG. 12 is a diagram illustrating an outline of an outgoing control method according to a second embodiment.

Next, a parking system S according to a second embodiment will be explained. Note that in the following, a part different from the first embodiment will be mainly described, and the common parts are represented with same symbols and the description is omitted appropriately. First, an outline of a parking control method according to the second embodiment will be explained with reference to FIG. 12. In the following, an outgoing control method for taking a vehicle out of a parking lot will be explained as the parking control method. FIG. 12 is a diagram illustrating the outline of the outgoing control method according to the second embodiment.

The outgoing control method according to the second embodiment is performed by a parking-lot managing apparatus 220a included in the parking system S, for example. As illustrated in FIG. 12, the parking system S includes: a parking lot 200a including the parking-lot managing apparatus 220a; the parking control system 1; and a terminal device 300. The parking control system 1 is provided in the vehicle C parked in the parking lot 200a. Assume that a user U that is a driver of the vehicle C possesses the terminal device 300.

Hereinafter, a case will be exemplified in which the own vehicle C parked in the parking lot 200a is taken out of the parking lot 200a by autonomous driving control. The parking lot 200a includes the plurality of parking frames 210, the parking-lot managing apparatus 220a, a plurality of getting-into places 240, and an exit 230a.

Each of the getting-into places 240 is a place used by a driver of the user U, one or more occupants of the vehicle C, etc. for getting into the vehicle C, and the plurality of getting-into places 240 is arranged in the parking lot 200a. In FIG. 12, the number of the getting-into places 240 is exemplified to be three, not limited thereto, the number of the getting-into places 240 may be two, alternatively, four or more. In FIG. 12, the number of the exits 230a of the parking lot 200a is exemplified to be one, not limited thereto, the number of the exits 230a may be two or more. It is sufficient that the getting-into place 240 may be one getting-into place that includes a plurality of places, from each of which a driver and/or one or more occupants can get into a vehicle.

The parking-lot managing apparatus 220a operates as a parking controller that performs outgoing control among parking controls, of the own vehicle C, to be mentioned later. Hereinafter, the parking controller that performs the outgoing control may be referred to as an outgoing controller. A specific configuration of the parking-lot managing apparatus 220a will be explained with reference to FIG. 13.

In the parking lot 200a configured as described above, the outgoing control of the own vehicle C using the autonomous driving control is performed. Assume that the own vehicle C is first parked in the parking lot 200a as illustrated in an upper part of FIG. 12.

The parking-lot managing apparatus 220a receives an outgoing instruction that requests taking out of the parking lot 200a using the autonomous driving control from the terminal device 300 of the user U who is going to the parking lot 200a (Step S1).

When receiving the outgoing instruction from the terminal device 300, the parking-lot managing apparatus 220a computes an estimated getting-into time interval until the user U gets into the own vehicle C at the getting-into place 240 (Step S2). Specifically, the parking-lot managing apparatus 220a computes, as the estimated getting-into time interval, a time interval from a time at which the user U travels from a present position for the getting-into place 240 to a time at which the user U gets into the own vehicle C, for each of the plurality of getting-into place 240. For example, the parking-lot managing apparatus 220a computes the estimated getting-into time interval in consideration of the age of the user U and a congestion situation of a route from a present position of the user U to the getting-into place 240 among other things in addition to a distance from the present position of the user U to the getting-into place 240.

Next, the parking-lot managing apparatus 220a computes an exit arrival time interval from a time at which the vehicle C starts from the getting-into place 240 to a time at which the vehicle C arrives at the exit 230a (Step S3). Specifically, the parking-lot managing apparatus 220a computes an exit arrival time interval from a time at which the vehicle C starts from each of the getting-into places 240 to a time at which the vehicle C arrives at the exit 230a (see arrows A12, A22 illustrated in FIG. 12). The parking-lot managing apparatus 220a estimates the exit arrival time interval in consideration of the number of outgoing instructions from the users U in addition to a distance from each of the getting-into places 240 to the exit 230a, for example. When the plurality of exits 230a are arranged in the parking lot 200a, the parking-lot managing apparatus 220a computes the exit arrival time interval from each of the getting-into places 240 to each of the exits 230a.

The parking-lot managing apparatus 220a computes a destination arrival time interval from a time at which the vehicle C to starts from the exit 230a of the parking lot 200a to a time at which the vehicle C arrives at a destination (Step S4). Specifically, when acquiring from the terminal device 300 the destination after taking out of the parking lot, the parking-lot managing apparatus 220a estimates a destination arrival time interval from a start from the exit 230a to an arrival at the acquired destination (see arrow A4 illustrated in FIG. 12). When the plurality of exits 230a is arranged in the parking lot 200a, the parking-lot managing apparatus 220a computes the destination arrival time interval from each of the exits 230a to the destination. The parking-lot managing apparatus 220a is explained to compute the destination arrival time interval, not limited thereto. For example, the terminal device 300 or a navigation apparatus (not illustrated) provided in the own vehicle C may compute the destination arrival time interval. In this case, assume that the parking-lot managing apparatus 220a informs the navigation apparatus of information on the exit 230a as a departure place and receives the destination arrival time interval from the navigation apparatus, for example.

Subsequently, the parking-lot managing apparatus 220a decides the getting-into place 240 to which the vehicle C is to travel, in accordance with the estimated getting-into time interval, the exit arrival time interval, and the destination arrival time interval that are computed in Steps S2 to S4 (Step S5). For example, the parking-lot managing apparatus 220a computes, for each of the getting-into places 240, a totalized time interval of the estimated getting-into time interval, the exit arrival time interval, and the destination arrival time interval, and decides to cause the vehicle C to travel to the getting-into place 240 of the short computed totalized time interval. When there exists the plurality of exits 230a, the parking-lot managing apparatus 220a computes a totalized time interval of the estimated getting-into time interval, the exit arrival time interval, and the destination arrival time interval for each combination of the corresponding getting-into place 240 and the corresponding exit 230a. The parking-lot managing apparatus 220a decides the getting-into place 240 of a short computed totalized time interval to be a travelling destination of the vehicle C, and further decides the exit 230a of the short totalized time interval to be a travelling destination, of the vehicle C, after the user U gets into the vehicle C.

The parking-lot managing apparatus 220a informs the user U and the vehicle C of the decided getting-into place 240 (Step S6). In this manner, the parking-lot managing apparatus 220a informs the user U of the decided getting-into place 240 so as to lead the user U to the decided getting-into place 240. The parking-lot managing apparatus 220a informs the vehicle C of the decided getting-into place 240 so as to cause the vehicle controller 40 of the vehicle C to perform autonomous driving control, and the vehicle C travels to the decided getting-into place 240.

When there exists the plurality of exits 230a, the parking-lot managing apparatus 220a informs the vehicle C of the exit 230a to which the vehicle C is decided to travel after the user U got into the vehicle C. Thus, for example, the vehicle controller 40 of the vehicle C is able to cause the vehicle C to travel to the decided exit 230a by autonomous driving control after the user U got into the vehicle C.

In this manner, in the present embodiment, the parking-lot managing apparatus 220a totalizes, for each of the getting-into places 240, an estimated getting-into time interval, an exit arrival time interval, and a destination arrival time interval so as to compute a totalized time interval needed for the user U to travel from a present position to a destination. Moreover, the parking-lot managing apparatus 220a decides the getting-into place 240 at which the user U gets into the vehicle C in accordance with the totalized time intervals. Thus, it is possible to improve the parking efficiency including the outgoing efficiency while shortening an arrival time interval to a destination, for example.

2.2. Overall Configuration of Parking System

Figure 13:
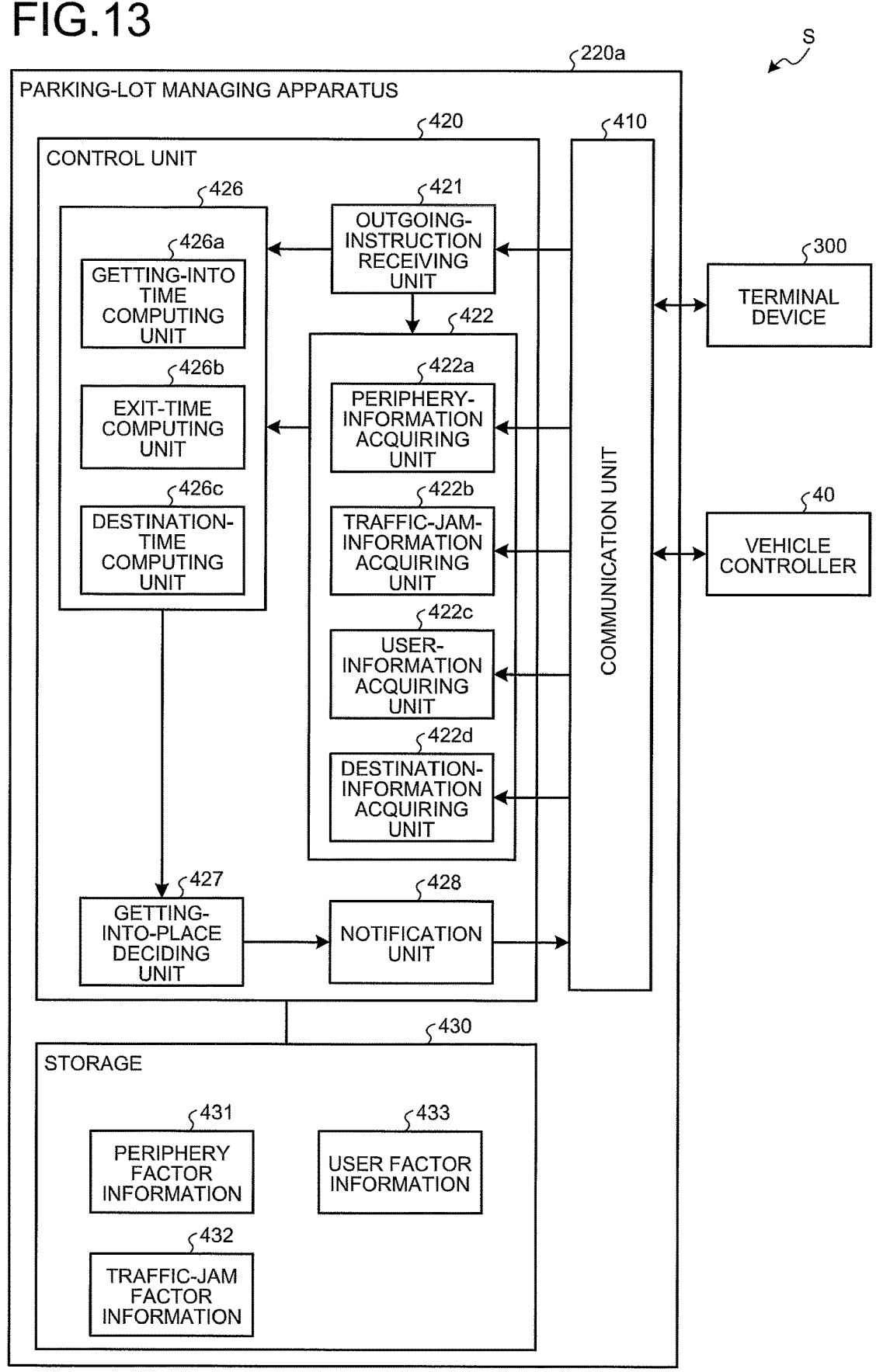
FIG. 13 is a block diagram illustrating a configuration example of a parking system.

Next, a configuration of the parking system S according to the second embodiment will be explained with reference to FIG. 13. FIG. 13 is a block diagram illustrating a configuration example of the parking system S.

As illustrated in FIG. 13, the parking system S includes the above-mentioned vehicle controller 40, the terminal device 300, and the parking-lot managing apparatus 220a.

The terminal device 300 is a portable device such as a mobile telephone and a smartphone. The terminal device 300 transmits an outgoing instruction received from the user U to the parking-lot managing apparatus 220a. The terminal device 300 informs the user U of the getting-into place 240 decided by the parking-lot managing apparatus 220a.

The parking-lot managing apparatus 220a includes a communication unit 410, a control unit 420, and a storage 430.

The communication unit 410 is a communication interface that connects to a network N to be able to perform a two-way communication. The communication unit 410 connects to the terminal device 300 and the vehicle controller 40 via the network N. The control unit 420 communicates with the terminal device 300 and the vehicle controller 40 via the communication unit 410 to be able to transmit and receive various kinds of information.

The control unit 420 includes an outgoing-instruction receiving unit 421, an acquisition unit 422, a computing unit 426, a getting-into-place deciding unit 427, and a notification unit 428. The control unit 420 is a microcomputer that includes, for example, a central processing unit (CPU) etc.

The storage 430 is a storage constituted of a storage device such as a non-volatile memory and a hard disc drive, and stores periphery factor information 431, traffic-jam factor information 432, and user factor information 433.

The outgoing-instruction receiving unit 421 receives an outgoing instruction sent from the terminal device 300, via the communication unit 410. The outgoing-instruction receiving unit 421 informs the acquisition unit 422 and the computing unit 426 of the received outgoing instruction.

The acquisition unit 422 includes a periphery-information acquiring unit 422a, a traffic-jam-information acquiring unit 422b, a user-information acquiring unit 422c, and a destination-information acquiring unit 422d.

The periphery-information acquiring unit 422a acquires periphery information of the parking lot 200a via the communication unit 410. The periphery information includes, for example, traffic-jam information from a present position of the user U, the number (hereinafter, may be referred to outgoing instruction number) of outgoing instructions received by the outgoing-instruction receiving unit 421, the weather in the periphery of the parking lot 200a, etc.

The periphery-information acquiring unit 422a acquires a situation including a congestion condition in the periphery of the user U, the weather in the periphery of the parking lot 200a, etc. from an external device to be connected via the network N, for example. Alternatively, the periphery-information acquiring unit 422a may acquire the congestion situation and the weather in the periphery of the user U, etc. on the basis of: sound information collected by a microphone of the terminal device 300 and image information of a camera of the terminal device 300; image information of one or more cameras arranged in the vicinity of the parking lot 200a; or the like. The periphery-information acquiring unit 422a acquires the outgoing instruction number from the outgoing-instruction receiving unit 421.

The periphery information acquired by the periphery-information acquiring unit 422a is output to the computing unit 426 to be mentioned later, and is used for computing an estimated getting-into time interval. It is sufficient that the periphery information acquired by the periphery-information acquiring unit 422a is information to be used for computing the estimated getting-into time interval, not limited to the above-mentioned example.

The traffic-jam-information acquiring unit 422b acquires traffic-jam information of the parking lot 200a and roads via the communication unit 410. The traffic-jam information includes: the outgoing instruction number; a traffic-jam situation in the periphery of the parking lot 200a; and a traffic-jam situation to a destination after taking out of the parking lot, for example.

The traffic-jam-information acquiring unit 422b acquires a traffic-jam situation in the vicinity of the parking lot 200a and that to the destination after taking out of the parking lot from an external device to be connected via the network N, for example. Assume that the destination after taking out of the parking lot is acquired from the destination-information acquiring unit 422d to be mentioned later. The traffic-jam-information acquiring unit 422b acquires the outgoing instruction number from the outgoing-instruction receiving unit 421.

The traffic-jam information acquired by the traffic-jam-information acquiring unit 422b is output to the computing unit 426 to be mentioned later, and is used for computing the exit arrival time interval and the destination arrival time interval. It is sufficient that the traffic-jam information acquired by the traffic-jam-information acquiring unit 422b is information to be used for computing the exit arrival time interval and the destination arrival time interval, not limited to the above-mentioned example.

The user-information acquiring unit 422c acquires user information of the user U via the communication unit 410. The user information includes, for example, information on a present position of the user U; a family configuration, an age, an accompanying person of the user U; the fatigue degree of the user U; an amount (the number of pieces and the weight) and types of luggage carried by the user U; and the like.

The user-information acquiring unit 422c acquires a present position of the user U on the basis of information obtained from a GPS device provided in the terminal device 300, for example. The user-information acquiring unit 422c acquires a family configuration, an age, etc. of the user U on the basis of information registered in the terminal device 300, for example. The user-information acquiring unit 422c acquires an amount of luggage carried by the user U on the basis of an image obtained by a camera provided in the terminal device 300 or arranged in the vicinity of the parking lot 200a, alternatively, in a store at which the user U shops, for example. The user-information acquiring unit 422c also acquires information on a type of the luggage such as a cart and a baby buggy. The amount of the luggage carried by the user U may be acquired from purchase data obtained from a credit card of the user U and the like, for example. The user-information acquiring unit 422c may acquire an amount of luggage carried when the user U got out of the vehicle C on the basis of an image captured by a camera arranged in the vicinity of the parking lot 200a, and may estimate an amount of luggage carried by the user U in accordance with the amount of luggage carried when the user U got out of the vehicle C and an amount of luggage increased in shopping etc.

The user-information acquiring unit 422c computes a moving speed of the user U by using a change in a present position of the user U, and estimates the fatigue degree of the user U on the basis of the computed moving speed, for example. The user-information acquiring unit 422c estimates that the fatigue degree of the user U is high when the moving speed decreases or when the number of times increases at which the moving speed becomes zero, for example. Alternatively, the user-information acquiring unit 422c acquires conversation of the user U by using a microphone provided in the terminal device 300, and estimates that the fatigue degree is high when conversation amount decreases, for example. The user-information acquiring unit 422c estimates that the fatigue degree of the user U is high when detecting a word associated with the fatigue degree of the user U, such as "tired" and "tough".

The user information acquired by the user-information acquiring unit 422c is output to the computing unit 426 to be mentioned later to be used for computing the estimated getting-into time interval. It is sufficient that the user information to be acquired by the user-information acquiring unit 422c is information to be used for computing the estimated getting-into time interval, not limited the above-mentioned example.

The destination-information acquiring unit 422d acquires, via the communication unit 410, a destination of the vehicle C after taking out of the parking lot, from the terminal device 300. For example, when the outgoing instruction to be received by the outgoing-instruction receiving unit 421 includes the destination, the destination-information acquiring unit 422d acquires the destination from the outgoing instruction. Alternatively, when receiving the outgoing instruction, the destination-information acquiring unit 422d may transmit, to the terminal device 300, a notification that requests an input of a destination, and may acquire the destination from the terminal device 300 as a response to this notification. When a destination after taking out of the parking lot is previously registered in a navigation apparatus (not illustrated) provided in the vehicle C, the destination-information acquiring unit 422d may acquire the destination from this navigation apparatus.

The computing unit 426 computes, for each of the getting-into places 240, an estimated time interval from a present position of the user U to the destination via the corresponding getting-into place 240. This estimated time interval is a totalized time interval of an estimated getting-into time interval, an exit arrival time interval, and a destination arrival time interval, which are computed by the computing unit 426. The computing unit 426 includes a getting-into time computing unit 426a, an exit time computing unit 426b, and a destination time computing unit 426c.

The getting-into time computing unit 426a computes the estimated getting-into time interval on the basis of user information acquired by the user-information acquiring unit 422c, periphery information acquired by the periphery-information acquiring unit 422a, the user factor information 433 and the periphery factor information 431 that are stored in the storage 430.

In this manner, the getting-into time computing unit 426a computes the estimated getting-into time interval on the basis of the user information and the periphery information, so that it is possible to estimate the estimated getting-into time interval with higher accuracy.

Specifically, the getting-into time computing unit 426a computes, for each of the getting-into places 240, (i) a getting-into place arrival time interval from a time at which the user U starts from a present position to a time at which the user U arrives at the corresponding getting-into place 240 and (ii) a getting-into time interval from a time at which the user U arrives at the corresponding getting-into place 240 to a time at which the user U gets into the vehicle C.

The getting-into time computing unit 426a selects a route from a present position of the user U to the getting-into place 240. The getting-into time computing unit 426a selects the route so that a distance to the getting-into place 240 is short. Alternatively, when the user U uses a cart, a baby buggy, or a wheelchair among other things, the getting-into time computing unit 426a selects a route via a road having few level differences. In a case of the rainy weather, for example, the getting-into time computing unit 426a selects a route for not getting wet in the rain, such as an underground road and an arcade. In this manner, the getting-into time computing unit 426a may select a route to the getting-into place 240 on the basis of the user information, which includes information on a type of luggage, and the periphery information. Thus, the getting-into time computing unit 426a is able to select a route according to the user U and the periphery situations.

For example, the getting-into time computing unit 426a may select a plurality of route candidates to the getting-into place 240, and the user U may select a route among from the route candidates. In this case, the getting-into time computing unit 426a transmits the selected route candidates to the terminal device 300 via the communication unit 410, and receives a selection result of the user U from the terminal device 300.

The getting-into time computing unit 426a estimates, for each of the getting-into places 240, a getting-into place arrival time interval when the user U travels by the selected route. In this case, the getting-into time computing unit 426a computes the getting-into place arrival time interval by using the user information and the periphery information, so that it is possible to compute the getting-into place arrival time interval with higher accuracy.

Specifically, the getting-into time computing unit 426a computes a reference arrival time interval in a case of arriving at the getting-into place 240 by following the selected route, and corrects the computed reference arrival time interval by using the user information and the periphery information so as to compute the getting-into place arrival time interval. The reference arrival time interval is computed on the basis of a distance of the selected route and a moving speed of a common user, for example.

The getting-into time computing unit 426a multiplies the computed reference arrival time interval by factors according to the user information and the periphery information so as to compute the getting-into place arrival time interval. These factors are previously stored in the storage 430 as the user factor information 433 and the periphery factor information 431.

Meanwhile, one example of the user factor information 433 will be explained with reference to FIGS. 14 and 15. FIGS. 14 and 15 are diagrams illustrating examples of the user factor information 433.

In FIG. 14, one example of factors according to ages included in the user information is depicted as one of pieces of the user factor information 433. As illustrated in FIG. 14, a factor of the user factor information 433 is set for each of the ages. For example, a factor of twenties is "1" and that of sixties is "1.3". The getting-into time computing unit 426a decides, for each of the ages of the users U, a factor on the basis of the user information. When there exist one or more accompanying persons with the user U, the getting-into time computing unit 426a selects the largest factor of factors of the user U and the one or more accompanying persons. Assume that information on the one or more accompanying persons is previously registered by the user U. Alternatively, the information on the one or more accompanying persons is acquired by the user-information acquiring unit 422c on the basis of an image captured by a camera provided in the terminal device 300, the parking lot 200a, or the like.

In FIG. 15, one example of factors according to luggage amount included in user information is depicted as one piece of the user factor information 433. As illustrated in FIG. 15, in a case of "no luggage", a factor "1" is set, for example. When the amount of luggage is amount "to be carried in one hand", a factor "1.1" is set. The getting-into time computing unit 426a decides the factor according to the luggage amount on the basis of the user information.

In this manner, the user factor information 433 is information to be used for deciding a factor for each piece of information included in the user information, such as an age and a family configuration. The user factor information 433 includes factors corresponding to fatigue degrees of a user in addition to the examples depicted in FIGS. 14 and 15. Similarly, the periphery factor information 431 is information to be used for deciding a factor for each piece of information included in the periphery information, such as a congestion situation and the weather. For example, when the population density on the selected route is divided into n-stages and factors are set to the respective n-stages, factors are able to be set in accordance with the congestion situation.

The user factor information 433 depicted in FIGS. 14 and 15 is merely one example, and not limited thereto. In the user factor information 433 depicted in FIG. 14, the factors are set for the respective corresponding ages; however, factors may be set for the respective classifications, such as "infant", "child", and "adult". The factors depicted in FIGS. 14 and 15 are merely one example, and they may be other values.

The getting-into time computing unit 426a multiplies a reference arrival time interval by factors decided on the basis of the user factor information 433 and the periphery factor information 431 so as to compute a getting-into place arrival time interval.

The getting-into time computing unit 426a is explained to compute a reference arrival time interval in accordance with a distance of the selected route, not limited thereto. For example, the getting-into time computing unit 426a may compute the reference arrival time interval on the basis of a distance of the selected route and a moving speed from a time at which the user U gets out of the vehicle C to a time at which the user U performs an outgoing instruction. Alternatively, an average time interval needed for another user to travel the selected route may be used as the reference arrival time interval. Thus, the getting-into time computing unit 426a is able to compute a reference arrival time interval with higher accuracy.

Next, the getting-into time computing unit 426a computes, for each of the getting-into places 240, a getting-into time interval from a time at which the user U arrives at the getting-into place 240 to a time at which the user U gets into the vehicle C. The getting-into time computing unit 426a computes, as a reference getting-into time interval, a getting-into time interval when the user U gets into the vehicle C rapidly after arriving at the getting-into place 240, and corrects the computed reference getting-into time interval by using the user information and the periphery information so as to compute the getting-into time interval.

The getting-into time computing unit 426a multiplies the computed reference getting-into time interval by the factors according to the user information and the periphery information so as to compute a getting-into time interval. The getting-into time computing unit 426a decides a factor whose value is larger as the outgoing instruction number included in the periphery information is larger, for example. The getting-into time computing unit 426a decides a factor in consideration of a time interval needed for shipping luggage in accordance with the amount of the luggage and a type of the luggage. When the luggage includes a cart, the getting-into time computing unit 426a decides a factor in consideration of a time interval needed for returning the cart. Assume that the factors are stored in the storage 430 as the periphery factor information 431 and the user factor information 433.

The getting-into time computing unit 426a is explained to use, as the reference getting-into time interval, the getting-into time interval in a case where the user U gets into the vehicle C rapidly after arriving at the getting-into place 240, not limited thereto. For example, the getting-into time computing unit 426a may use, as the reference getting-into time interval, an average value of getting-into time intervals of other users, each of which is during a predetermined time interval including the present time point. Alternatively, a time interval needed for the user U to get out of the vehicle C may be employed as the reference getting-into time interval.

The getting-into time computing unit 426a is explained to decide the factor on the basis of the user information of the user U, not limited thereto. For example, the getting-into time computing unit 426a may decide the factor on the basis of the user information of another user. Specifically, for example, the getting-into time computing unit 426a may compute, by using the user information of a user that used the getting-into place 240 before the user U, a getting-into time interval of this user so as to decide the factor in accordance with the computed getting-into time interval. For example, when a getting-into time interval of a user that used the getting-into place 240 before the user U is long, there exists the possibility that a getting-into time interval of the user U also becomes long. Hence, when the getting-into time interval of the user U is computed by using the user information of a user other than the user U, it is possible to compute the getting-into time interval of the user U with higher accuracy.

The getting-into time computing unit 426a totalizes, for each of the getting-into places 240, the computed getting-into place arrival time interval and getting-into time interval so as to compute an estimated getting-into time interval. The getting-into time computing unit 426a outputs the computed estimated getting-into time interval to the getting-into-place deciding unit 427.

The exit time computing unit 426b computes, for each of the getting-into places 240, an exit arrival time interval from a time at which the vehicle starts from the corresponding getting-into place 240 to the getting-into place 240 the vehicle arrives at the exit 230a on the basis of the traffic-jam information.

In this manner, the exit time computing unit 426b computes the exit arrival time interval on the basis of the traffic-jam information to be able to estimate the exit arrival time interval with higher accuracy.

The exit time computing unit 426b computes the reference travelling time interval in accordance with a distance from each of the getting-into places 240 to the exit 230a and a speed limit of the parking lot 200a, for example, and multiplies the computed reference travelling time interval by a factor according to the traffic-jam information so as to compute the exit arrival time interval.

The exit time computing unit 426b multiplies the reference travelling time interval by a factor according to the outgoing instruction number included in the traffic-jam information, for example, so as to compute an exit arrival time interval. The factor according to the outgoing instruction number is a factor whose value is larger as the outgoing instruction number is larger, for example, and is assumed to be previously stored in the storage 430 as the traffic-jam factor information 432.

The exit time computing unit 426b multiplies a reference travelling time interval by a factor, which is included in the traffic-jam information, according to a congestion situation of a road in the periphery of the parking lot 200a so as to compute an exit arrival time interval, for example. For example, when a road in the periphery of the parking lot 200a is congested, because it takes time to travel from the exit 230a to the road, it can be considered that a time interval needed for the vehicle C to arrive at the exit 230a becomes long. Therefore, the exit time computing unit 426b multiplies the reference travelling time interval by the factor whose value is larger as the road in the periphery of the parking lot 200a is congested more heavily so as to compute the exit arrival time interval.

The exit time computing unit 426b is explained to compute the exit arrival time interval on the basis of the traffic-jam information, not limited thereto. For example, an average value of time intervals needed for other vehicles to travel from the getting-into place 240 to the exit 230a, each of which is during a predetermined time interval including the present time point, may be used as the exit arrival time interval. The exit time computing unit 426b may compute an exit arrival time interval including a departure time interval from a time at which the user U gets into the vehicle C to a time at which the vehicle C starts. This departure time interval may be computed by using an average time interval of past departure time intervals of the user U, for example.

The destination time computing unit 426c computes a destination arrival time interval from a time at which the vehicle starts from the exit 230a to a time at which the vehicle arrives at a destination, on the basis of the traffic-jam information. The destination time computing unit 426c selects a route from the exit 230a to the destination so as to compute a destination arrival time interval of the selected route. For example, the destination time computing unit 426c may select a plurality of route candidates to a destination, and the user U may select a route among from the route candidates. In this case, the destination time computing unit 426c transmits the selected route candidates to the terminal device 300 via the communication unit 410, and receives a selection result of the user U from the terminal device 300. Alternatively, the destination time computing unit 426c may acquire preference orders when the user U selects routes, and may select a route in accordance with the acquired preference orders. As the preference orders, for example, there exist "toll road priority", "general road priority", "arrival time point priority", etc.

The getting-into-place deciding unit 427 totalizes an estimated getting-into time interval, an exit arrival time interval, and a destination arrival time interval, which are computed by the computing unit 426, so as to compute an estimated time interval for each of the getting-into places 240. The getting-into-place deciding unit 427 decides, as the getting-into place 240 to which the user U is led, the getting-into place 240 having the shortest computed estimated time interval. The getting-into-place deciding unit 427 outputs the decided getting-into place 240 to the notification unit 428.

The notification unit 428 informs, via the communication unit 410, the terminal device 300 and the vehicle controller 40 of the getting-into place 240 decided by the getting-into-place deciding unit 427. In this case, the notification unit 428 may inform the terminal device 300 of a route, which is selected by the getting-into time computing unit 426a, to the getting-into place 240 that is decided by a present position of the user U. Thus, the parking-lot managing apparatus 220a is able to present, to the user U, the decided route to the getting-into place 240.

The notification unit 428 may inform the vehicle C of a route, which is selected by the destination time computing unit 426c, to a destination in addition to the decided getting-into place 240. Thus, the vehicle C need not retrieve a route to the destination, so that it is possible to reduce processing load of the vehicle C. The user U need not input again the destination to the vehicle C, so that it is possible to save the trouble, of the user U, of inputting.

When receiving information on the decided getting-into place 240 from the parking-lot managing apparatus 220a, the vehicle controller 40 causes the vehicle C to travel to this getting-into place 240 by autonomous driving control.

Figure 16:
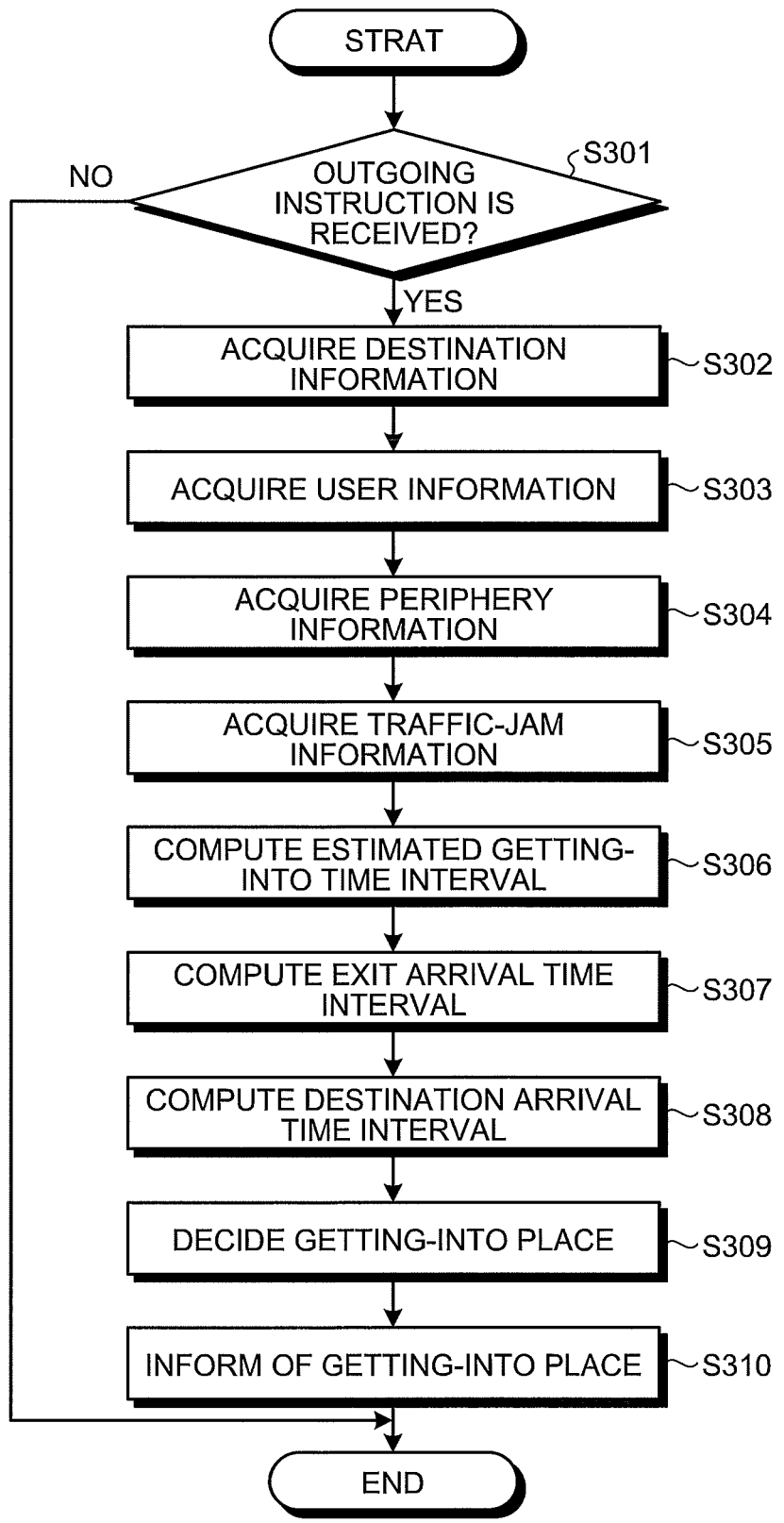
FIG. 16 is a flowchart illustrating a procedure for an outgoing control process.

2.3. Outgoing Control Process of Parking-Lot Managing Apparatus According to Second Embodiment Next, a specific processing procedure in the parking-lot managing apparatus 220a will be explained with reference to FIG. 16. FIG. 16 is a flowchart illustrating a procedure for an outgoing control process to be executed by the parking-lot managing apparatus 220a. The parking-lot managing apparatus 220a repeatedly executes the processing procedure illustrated in FIG. 16 with a predetermined period from a time at which the vehicle C is parked in the parking lot 200a.

As illustrated in FIG. 16, the control unit 420 of the parking-lot managing apparatus 220a determines whether or not an outgoing instruction is received (Step S301). When the outgoing instruction is not received (Step S301: No), the process is terminated.

On the other hand, when receiving the outgoing instruction (Step S301: Yes), the control unit 420 acquires destination information from the terminal device 300 (Step S302). Next, the control unit 420 acquires user information (Step S303), and further acquires periphery information (Step S304). Subsequently, the control unit 420 acquires traffic-jam information (Step S305).

Subsequently, the control unit 420 computes an estimated getting-into time interval from a time at which the user U starts from a present position to a time at which the user U gets into the vehicle C at each of the getting-into places 240 (Step S306). Next, the control unit 420 computes an exit arrival time interval from a time at which the user U gets into the vehicle C at each of the getting-into places 240 to a time at which the vehicle arrives at the exit 230a (Step S307), and computes a destination arrival time interval from a time at which the vehicle C starts from the exit 230a to a time at which the vehicle C arrives at a destination (Step S308).

The control unit 420 decides the getting-into place 240 at which the user U is to get into the vehicle C on the basis of the estimated getting-into time interval, the exit arrival time interval, and the destination arrival time interval that are computed in Steps S306 to S308 (Step S309).

The control unit 420 informs the user U and the vehicle controller 40 of the vehicle C of the getting-into place 240 decided in Step S309 (Step S310).

The orders of the processes of Steps S302 to S304 may be exchanged, or the processes of Steps S302 to S304 may be executed simultaneously. Similarly, the orders of the processes of Steps S306 to S308 may be exchanged, or the processes of Steps S306 to S308 may be executed simultaneously.

As described above, the parking-lot managing apparatus 220a according to the second embodiment includes the outgoing-instruction receiving unit 421, the computing unit 426, the getting-into-place deciding unit 427, and the notification unit 428.

The outgoing-instruction receiving unit 421 receives, from the user U, an outgoing instruction of the vehicle C that is parked in the parking lot 200a including the plurality of getting-into place 240. The computing unit 426 computes, for each of the getting-into places 240, an estimated time interval including (i) an estimated getting-into time interval from a time at which the user U starts from a present position for the getting-into place 240 to a time at which the user U gets into the vehicle C, (ii) an exit arrival time interval from a time at which the vehicle C starts from the corresponding getting-into place 240 to a time at which the vehicle C arrives at the exit 230a of the parking lot 200a, and (iii) a destination arrival time interval from a time at which the vehicle C starts from the exit 230a of the parking lot 200a to a time at which the vehicle C arrives at a destination.

The getting-into-place deciding unit 427 decides, in accordance with the estimated time intervals, the getting-into place 240, of the plurality of getting-into places 240, to which the vehicle C is to travel, on the basis of the outgoing instruction from the user U. The notification unit 428 informs the user U and the vehicle C of the decided getting-into place 240.

Thus, the parking-lot managing apparatus 220a is able to perform outgoing control in consideration of a route from the present position of the user U to the destination, so that it is possible to improve the parking efficiency including the outgoing efficiency.

In the above-mentioned second embodiment, the parking-lot managing apparatus 220a is explained to decide the getting-into place 240; however, not limited thereto. For example, the parking controller 10 of the vehicle C or the terminal device 300 may decide the getting-into place 240. In this case, the parking controller 10 of the vehicle C or the terminal device 300 operates as the outgoing controller.

The user information, the periphery information, and the traffic-jam information are explained to be acquired after the parking-lot managing apparatus 220a receives an outgoing instruction, not limited thereto. For example, the parking-lot managing apparatus 220a may acquire the user information, the periphery information, and the traffic-jam information during a period from a time at which the user U gets out of the vehicle C to a time at which the parking-lot managing apparatus 220a receives the outgoing instruction.

In the aforementioned, the parking-lot managing apparatus 220a is explained to select the getting-into place 240 having the shortest estimated time interval; however, not limited thereto. The estimated time interval is a totalized time interval of an estimated getting-into time interval, an exit arrival time interval, and a destination arrival time interval. For example, when the fatigue degree of the user U is high, the parking-lot managing apparatus 220a may select the getting-into place 240 having the shortest estimated getting-into time interval. Alternatively, the user U may select the getting-into place 240 on the basis of an estimated getting-into time interval, an exit arrival time interval, a destination arrival time interval, and an estimated time interval.

In the aforementioned, the vehicle controller 40 is explained to cause the vehicle C to travel to the getting-into place 240 when receiving a notification on the getting-into place 240; however, not limited thereto. For example, assume that a time interval until the user U arrives at the getting-into place 240 is longer than that needed for the vehicle controller 40 to cause the vehicle C to travel to the getting-into place 240. In this case, the vehicle controller 40 may cause the vehicle C to travel so that the vehicle C arrives at the getting-into place 240 at a time point at which the user U arrives at the getting-into place 240. Alternatively, the notification unit 428 may inform the vehicle controller 40 of the getting-into place 240 at a timing according to a time point when the user U arrives at the getting-into place 240. Thus, it is possible to cause the vehicle C to travel to the getting-into place 240 without inhibiting another user from getting into another vehicle.

On the other hand, assume that a time interval until the user U arrives at the getting-into place 240 is shorter than a time interval needed for the vehicle controller 40 to cause the vehicle C to travel to the getting-into place 240, for example. In this case, the notification unit 428 may not only inform the user U of a congestion situation of the parking lot 200a, but also present a route change to the getting-into place 240, or present a stop-around place such as a rest area. Thus, it is possible to perform the outgoing control efficiently while reducing decrease in the convenience of the user U.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A parking controller comprising:
   a processor configured to execute a process that includes:
      acquiring, from data acquired at least in part using a sensor on an own vehicle, information indicating a specific parking frame, the specific parking frame being a parking frame that is specified by an external device among from a plurality of parking frames in a parking lot;
      setting the specific parking frame as a target parking frame, the target parking frame being a parking frame to be a target;

detecting a vacant parking frame while the own vehicle is travelling to the target parking frame, the vacant parking frame being a parking frame in a vacant state,
wherein the setting includes changing, when the vacant parking frame is detected in the detecting, the set target parking frame into the vacant parking frame, and
wherein the own vehicle is controlled by an autonomous control system, and the changing the set target parking frame into the vacant parking frame occurs automatically upon detection of the vacant parking frame.

2. The parking controller according to claim 1, wherein the processor is further configured to:
determine whether or not parking of the own vehicle into the target parking frame is completed; and
transmit, to the external device, information indicating the parked target parking frame when the determining determines that the parking into the target parking frame is completed.

3. The parking controller according to claim 1, wherein the processor is further configured to:
determine whether or not there exists another travelling vehicle around the vacant parking frame when the detecting detects the vacant parking frame; and
determine preference degrees of the own vehicle and the another travelling vehicle for the vacant parking frame when determined that there exists the another travelling vehicle, wherein
setting sets the target parking frame based on a determination result of the determining preference degrees.

4. The parking controller according to claim 3, wherein the setting changes the target parking frame into the vacant parking frame when the preference degree of the own vehicle for the vacant parking frame is higher than that of the another travelling vehicle.

5. The parking controller according to claim 3, wherein the determining preference degrees includes acquiring, for each of the own vehicle and the another travelling vehicle, as corresponding preference degree information at least one of (i) corresponding acquisition time point information on a time at which information indicating the specific parking frame is acquired, (ii) corresponding distance information from a present position to the vacant parking frame, (iii) corresponding vehicle-size information, (iv) corresponding number-of-occupants information, and (v) corresponding history information indicating a use history of the parking lot, and determining a corresponding preference degree based on the acquired corresponding preference degree information.

6. The parking controller according to claim 3, wherein the determining preference degrees does not determine the preference degrees when receiving from the other vehicle information indicating a determination result of the preference degrees, for the vacant parking-frame, of the own vehicle and the another travelling vehicle.

7. The parking controller according to claim 1, wherein the processor is further configured to:
determine whether or not the specific parking frame, which is set as the target parking frame, is a predetermined parking frame that satisfies a predetermined condition, wherein
the setting includes forbidding changing the target parking frame into the vacant parking frame when the detecting detects the vacant parking frame and the determining determines that the specific parking frame is the predetermined parking frame.

8. The parking controller according to claim 1, wherein the processor is further configured to:
determine whether or not parking of the own vehicle into the changed target parking frame has completed; and
transmit, to the external device, information indicating the changed target parking frame in which the own vehicle is parked, when determined that the parking into the changed target parking frame has completed.

9. A parking controller that automatically performs a parking control on a vehicle in a parking lot including a plurality of getting-into places, the parking controller comprising:
a processor configured to execute a process that includes:
receiving, from a user, an outgoing instruction of the vehicle parked in the parking lot;
computing, for each of the getting-into places, an estimated time interval including (i) an estimated getting-into time interval from a time at which the user starts from a present position for a corresponding getting-into place to a time at which the user gets into the vehicle, (ii) an exit arrival time interval from a time at which the vehicle starts from the corresponding getting-into place to a time at which the vehicle arrives at an exit of the parking lot, and (iii) a destination arrival time interval from a time at which the vehicle starts from the exit of the parking lot to a time at which the vehicle arrives at a destination;
deciding, in accordance with the estimated time interval, a getting-into place, of the plurality of getting-into places, to which the vehicle is to travel, based on the outgoing instruction from the user; and
informing the user and the vehicle of the decided getting-into place,
wherein the vehicle is controlled by an autonomous control system, and the computing, the deciding, and the informing occurs automatically upon reception of the outgoing instruction.

10. The parking controller according to claim 9, wherein the computing computes the estimated getting-into time interval based on user information that includes at least one of (i) a family configuration of the user, (ii) an age of the user, (iii) a time interval needed for the user to get into the vehicle, (iv) a fatigue degree of the user, (v) a number of pieces of luggage carried by the user, and (vi) a weight of the luggage carried by the user.

11. The parking controller according to claim 9, wherein the computing computes the estimated getting-into time interval based on periphery information that includes at least one of (i) a situation between the present position of the user and the parking lot, (ii) a number of outgoing instructions, and (iii) weather.

12. The parking controller according to claim 9, wherein the computing computes the exit arrival time interval based on congestion information that includes at least one of (i) a number of outgoing instructions and (ii) traffic-jam information in a periphery of the parking lot.

13. A parking control system comprising:
the parking controller according to claim 1; and
a vehicle controller that controls the vehicle based on a signal output from the parking controller.

14. A parking control system comprising:
the parking controller according to claim 9; and
a vehicle controller that controls the vehicle based on a signal output from the parking controller.

15. A parking control method comprising:
- acquiring, from data acquired at least in part using a sensor on an own vehicle, information indicating a specific parking frame, the specific parking frame being a parking frame that is specified by an external device among from a plurality of parking frames in a parking lot;
- setting the specific parking frame as a target parking frame, the target parking frame being a parking frame to be a target; and
- detecting a vacant parking frame while the own vehicle is travelling to the target parking frame, the vacant parking frame being a parking frame in a vacant state, and wherein
- the setting includes changing, when the vacant parking frame is detected in the detecting, the set target parking frame into the vacant parking frame, and
- wherein the own vehicle is controlled by an autonomous control system, and the changing the set target parking frame into the vacant parking frame occurs automatically upon detection of the vacant parking frame.

16. A parking control method for automatically performing a parking control on a vehicle in a parking lot including a plurality of getting-into places, the method comprising:
- receiving, from a user, an outgoing instruction of the vehicle parked in the parking lot;
- computing, for each of the getting-into places, an estimated time interval including (i) an estimated getting-into time interval from a time at which the user starts from a present position for a corresponding getting-into place to a time at which the user gets into the vehicle, (ii) an exit arrival time interval from a time at which the vehicle starts from the corresponding getting-into place to a time at which the vehicle arrives at an exit of the parking lot, and (iii) a destination arrival time interval from a time at which the vehicle starts from the exit of the parking lot to a time at which the vehicle arrives at a destination;
- deciding, in accordance with the estimated time interval, a getting-into place, of the plurality of getting-into places, to which the vehicle is to travel, based on the outgoing instruction from the user; and
- informing the user and the vehicle of the decided getting-into place,
- wherein the vehicle is controlled by an autonomous control system, and the computing, the deciding, and the informing occurs automatically upon reception of the outgoing instruction.

* * * * *